United States Patent
Burtovyy et al.

(10) Patent No.: US 12,251,668 B2
(45) Date of Patent: Mar. 18, 2025

(54) SUPPORTED MEMBRANES BY THERMAL AND UV INITIATED MASS POLYMERIZATION

(71) Applicant: PROMERUS, LLC, Akron, OH (US)

(72) Inventors: Oleksandr Burtovyy, Akron, OH (US); Doug Skilskyj, Akron, OH (US); Larry F Rhodes, Akron, OH (US)

(73) Assignee: PROMERUS, LLC, Akron, OH (US)

( * ) Notice: Subject to any disclaimer, the term of this patent is extended or adjusted under 35 U.S.C. 154(b) by 0 days.

(21) Appl. No.: 18/390,093

(22) Filed: Dec. 20, 2023

(65) Prior Publication Data
US 2024/0216875 A1    Jul. 4, 2024

Related U.S. Application Data

(60) Provisional application No. 63/433,981, filed on Dec. 20, 2022.

(51) Int. Cl.
*B01D 71/72* (2006.01)
*B01D 67/00* (2006.01)
*B01J 31/12* (2006.01)

(52) U.S. Cl.
CPC ......... *B01D 71/72* (2013.01); *B01D 67/0006* (2013.01); *B01J 31/12* (2013.01); *B01J 2231/30* (2013.01)

(58) Field of Classification Search
None
See application file for complete search history.

(56) References Cited

U.S. PATENT DOCUMENTS

| 7,148,176 B2 | 12/2006 | Beller et al. |
| 2011/0143260 A1 | 6/2011 | Bell et al. |

FOREIGN PATENT DOCUMENTS

| WO | WO 95-14048 A1 | 5/1995 |
| WO | WO 2018/129121 A1 | 7/2018 |
| WO | WO 2020-243381 A1 | 12/2020 |

OTHER PUBLICATIONS

Written Opinion of the ISA: PCT/US2023/085004, Apr. 29, 2024.

*Primary Examiner* — Krishnan S Menon
(74) *Attorney, Agent, or Firm* — Balaram Gupta

(57) ABSTRACT

Embodiments in accordance with the present invention encompass a composition comprising one or more of polycyclic olefinic monomers of formula (I) and one or more monomers of formula (III) for forming anion exchange membrane optionally in combination with one or more monomers of formula (II). The composition undergoes mass vinyl addition polymerization either under thermal or photolytic conditions and can be formed into ionomers on a suitable membrane support. The membrane supports thus formed are suitable as anion exchange membranes for fabricating a variety of electrochemical devices, among others. More specifically, the ionomeric membranes are formed on a variety of supports which contains a variety of quaternized amino functionalized norbornene monomeric units which are lightly crosslinked (less than five mol %). The membranes so formed exhibit very high ionic conductivity of up to 280 mS/cm at 80° C. The electrochemical devices made in accordance of this invention are useful as fuel cells, gas separators, and the like.

18 Claims, 4 Drawing Sheets

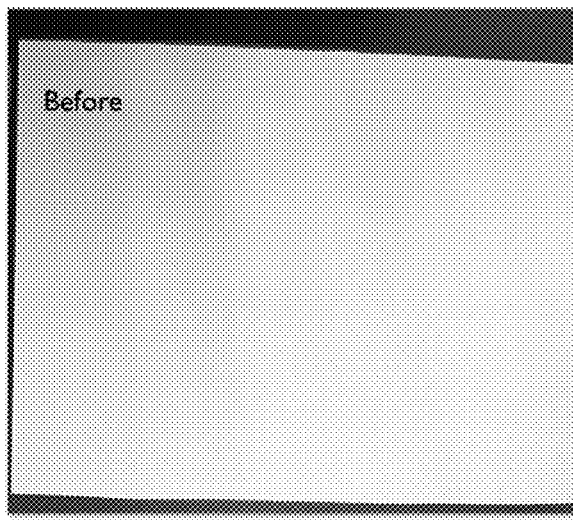
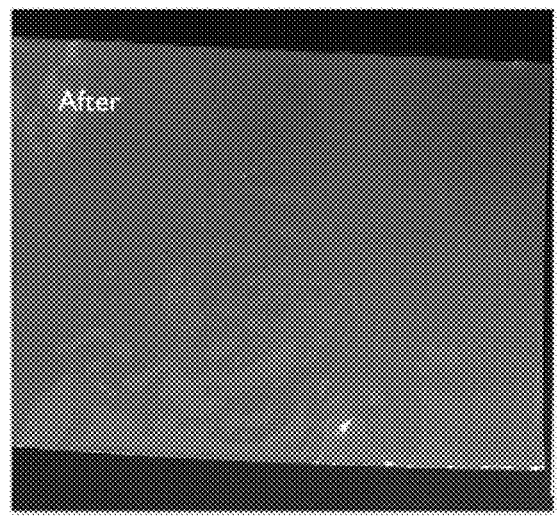
FIG. 2A  FIG. 2B
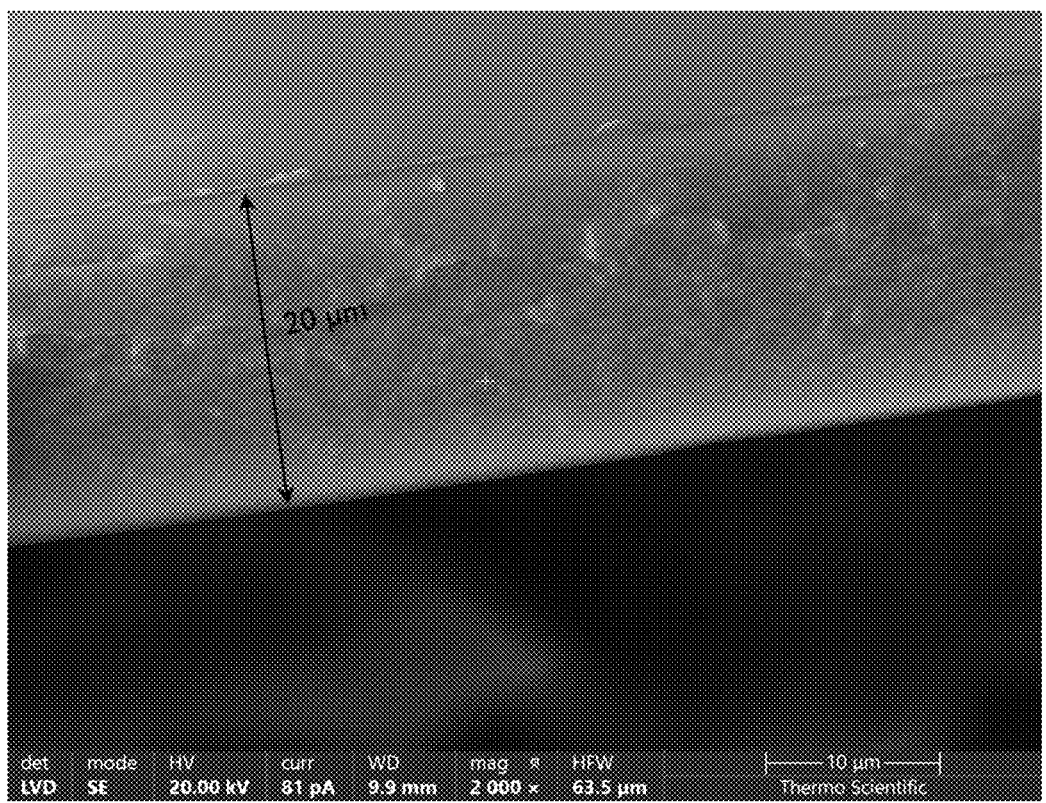
FIG. 3

SUPPORTED MEMBRANES BY THERMAL AND UV INITIATED MASS POLYMERIZATION

CROSS REFERENCE TO RELATED APPLICATIONS

This application claims the benefit of U.S. Provisional Application No. 63/433,981, filed Dec. 20, 2022, which is incorporated herein by reference in its entirety.

BACKGROUND OF THE INVENTION

Field of the Invention

The present invention relates to a series of mass polymerizable compositions which are suitable in the manufacture of a variety of supported membranes such as, for example, anion exchange membranes that are used in a variety of electrochemical devices. More specifically, a variety of compositions encompassing various mass polymerizable functionalized norbornene monomers can be used to form ionomeric polymeric porous films supported on a number of membrane support. This invention also relates to a method of manufacturing anion exchange membrane supported on a various supports which are used in a variety of electrochemical devices, which are useful as fuel cells, gas separators, redox flow batteries, hydrogen producing water electrolysis devices and the like.

Description of the Art

Energy conversion devices using solid polymer electrolytes such as fuel cells, electrolyzers to produce hydrogen from water and for separations are promising options because of their simplicity, high thermodynamic efficiency and solid-state design. See for example, B. C. H. Steele and A. Heinzel, Nature, 2001, 414, 345. These devices are also scalable and can be used for transportation, remote and distributed power, small and large scale facilities for electricity and hydrogen production, and for separating specific chemical, such as carbon dioxide, oxygen or hydrogen. More importantly, fuel cells are a clean energy conversion technology with the potential to reduce the use of fossil fuels. More specifically, fuel cells can be used in stationary power generation, portable electronics, and transportation. In addition, fuel cells are environmentally friendly, can be easy to refuel, and can have high energy conversion efficiency.

Various solid polymer electrolytes in the form of membranes are used in such energy conversion devices. There are at least two broad categories of polymer electrolyte membranes, namely, proton (or cation) exchange membranes (PEMs) and anion exchange membranes (AEMs). An advantageous attributes of AEMs or PEMs include simplicity in fabrication of electrodes with a three-phase boundary because liquid/gas pressures do not have to be balanced like in liquid electrolyte devices. Although there are a few commercial fuel cell electric vehicles and stationary power generators based on PEM membranes, they are still economically less attractive as they employ platinum-based electrocatalysts and perfluorinated polymer membranes.

High pH AEMs have facile oxygen reaction kinetics compared to acid conducting PEMs and offer the opportunity to use non-precious metal catalysts, and reduced fuel crossover. However, early membranes suffered from low ion conductivity, poor chemical stability at high pH, and high water-uptake. More recently, higher conductivity (e.g., 100 mS/cm at 80° C.) and chemical stability (80° C. in 1 M NaOH) has been achieved by a number of researchers, as reviewed by Arges. See, Arges et al., ACS Appl. Energy Mater. 2018, 1, 2991-3012. This notable progress has shown that certain structural moieties can be used to address pervious AEM deficiencies.

Electrolyzers producing hydrogen from water are an emerging enabling technology for the hydrogen economy. Electrochemical separations can enrich or deplete gas or liquid feed streams of chemical species, such as carbon dioxide, oxygen and hydrogen. AEM-based devices have the potential to lower the cost of ownership of these devices compared to PEM-based devices because the anionic environment, especially high pH environment using hydroxide ions as the electroactive ion, is advantageous for the oxygen reduction reaction (ORR), oxygen evolution reaction (OER) kinetics, enabling the use of non-platinum catalysts. See for example, D. R. Dekel, Journal of Power Sources, 2018, 375, 158-169.

In addition, a variety of low-cost monomers can be used to synthesize hydrocarbon-based anion or hydroxide ion conducting polymers that are stable in alkaline conditions, compared to the perfluorinated polymers needed for PEM-based electrochemical devices. See for example, P. A. Kohl, et al., Energy & Environmental Science, 2014, 7, 3135-3191. Furthermore, perfluorinated polymers are expensive and dangerous to manufacture, and present significant hazards due to monomer reactivity.

However, a majority of AEMs currently available do not meet the stringent property requirement of an ideal AEM, which include among others the following: (i) high anion (e.g. hydroxide) conductivity, (ii) long-term alkaline stability at the AEM device operating temperature, (iii) robust mechanical properties for withstanding in-use pressure differences and avoiding polymer creep under compression, and (iv) control over excessive water uptake, which can disrupt ion transport within the electrodes and membrane. See for example, S. Gottesfeld, et al., Journal of Power Sources, 2018, 375, 170-184.

It should further be noted that the structure of the polymer backbone, the position of the cations in the polymer architecture and the nature of the cations determine the conductivity and long-term alkaline stability of AEMs. Polymer backbones containing polysulfone, polyketone and poly(aryl ether) moieties are susceptible to hydroxide attack and polymer backbone degradation, and therefore are not suitable for forming AEMs. See for example, Zhang, X., et al., Polym. Chem. 2018, 9, 699-711 (block poly(arylene ether sulfone) copolymers as AEMs); and Akiyama, R., et al., Macromolecules 2016, 49, 4480-4489 (aromatic copolymers from dimethylaminomethylated monomers).

A few of the AEMs reported in the art exhibit conductivity of over 100 mS/cm (60° C. to 80° C.) and some report AEMs having conductivity at or near 200 mS/cm at 80° C. See for example, P. A. Kohl, et al., Journal of Materials Chemistry A, 2016, 4, 16233-16244; and L. Zhu, T. J. Zimudzi, N. Li, J. Pan, B. Lin and M. A. Hickner, Polymer Chemistry, 2016, 7, 2464-2475.

It has been found that polymer backbones in a block copolymer (BCP) architecture form efficient ion-conducting channels and lead to high ionic conductivity. See, for example, P. A. Kohl, et al., J. Electrochem. Soc., 2020, 167, 054501. However, synthesizing BCP architectures is more difficult, expensive and restrictive than synthesizing random copolymers, especially on an industrial scale. Additionally, these methods are difficult to scale-up industrially as there is a need to form the polymers first which are then converted into films and/or membrane materials, thus involving capital intensive manufacturing methods. Even more importantly, all of the prior art methods employs polymers which needs to be dissolved in solvents for coating the membrane support. The use of solvents pose not only environmental problems but also scale up on an industrial scale is expensive.

Accordingly, there is still a need to develop AEMs in an industrial scale that can be formed with no generation of industrial waste and exhibit not only high conductivity but also a combination of better properties including mechanical properties and long term stability as stated above.

Accordingly, it is an object of this invention to provide a series of mass polymerizable compositions containing a variety of polycycloolefinic monomers, which can be mass polymerized either thermally or by subjecting to a suitable actinic radiation to form supported membranes which function as AEMs exhibiting such improved properties.

It is also an object of this invention to provide processes for the preparation of the supported membranes either by thermal and/or actinic radiation initiated mass polymerization as disclosed herein.

Other objects and further scope of the applicability of the present invention will become apparent from the detailed description that follows.

SUMMARY OF THE INVENTION

Surprisingly, it has now been found that various compositions containing one or more monomers of formula (I) and one or more monomers of formula (III) optionally in combination with one or more monomers of formula (II) in the presence of suitable palladium compounds of formulae (IV) or (V) as described herein undergo mass polymerization when subjected to suitable thermal and/or actinic conditions form a films suitably supported on a support which can be used as membranes, such as for example, an anion exchange membrane. In particular, the anion exchange membranes made in accordance with this invention exhibits hitherto unattainable properties. More specifically, the membranes made from the compositions containing one or more monomers of formula (I) and one or more monomers of formula (III) are treated with suitable tri($C_1$-$C_4$)alkyl amine to form a quaternized ammonium ion containing membranes and wherein the mass polymerized membrane contains a portion of the repeat units of formula (III) crosslinked with each other, thus resulting in a membrane that exhibits low water uptake. The membranes thus formed also exhibit high ionic conductivity of up to 200 mS/cm at 80° C. and are stable for a long period of time of up to 1,000 hours or longer in 1 M sodium hydroxide solution at 80° C., and therefore, are suitable as chemically very stable anion exchange membranes (AEM). In some embodiments the composition employed to form the solid objects including the membrane further contains one or more monomers of formula (II) as described herein. The membranes formed from the composition of this invention also exhibit a very high ion-exchange capacity (IEC) from about 3 meq/g to about 4 meq/g or higher. Therefore, the membranes formed in accordance with this invention are useful in a variety of applications including electrochemical devices, such as AEM fuel cells, electrolyzers, among others.

BRIEF DESCRIPTION OF THE DRAWINGS

FIG. 2A shows a photograph of a polypropylene support coated with a composition of this invention (designated "Before") and FIG. 2B shows the fully mass polymerized and cured coated polypropylene support which can be used in the fabrication of the AEM in accordance of this invention (designated "After").

FIG. 3 shows the scanning electron micrograph (SEM) cross-section of one of the AEM surfaces made in accordance of this invention.

DETAILED DESCRIPTION OF THE INVENTION

Figure 1:
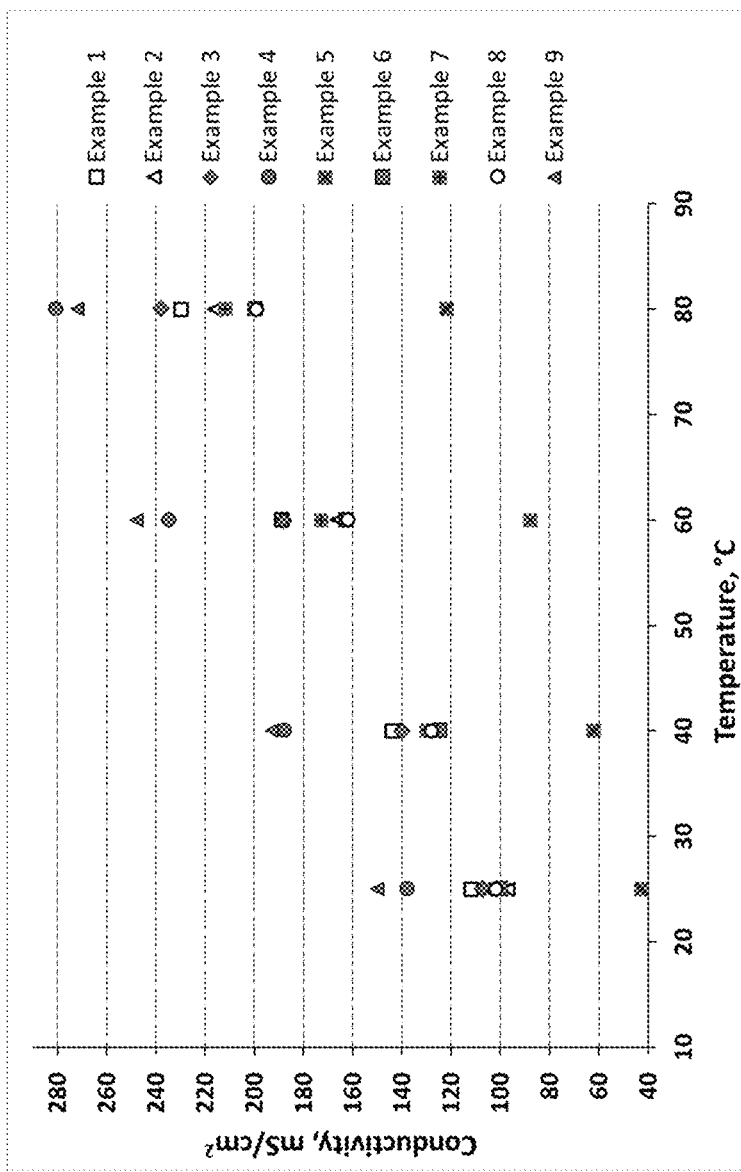
FIG. 1 shows graphical relationship of ionic conductivity at different temperatures of various films made in accordance of this invention.

The terms as used herein have the following meanings:

As used herein, the articles "a," "an," and "the" include plural referents unless otherwise expressly and unequivocally limited to one referent.

Since all numbers, values and/or expressions referring to quantities of ingredients, reaction conditions, etc., used herein and in the claims appended hereto, are subject to the various uncertainties of measurement encountered in obtaining such values, unless otherwise indicated, all are to be understood as modified in all instances by the term "about."

Where a numerical range is disclosed herein such range is continuous, inclusive of both the minimum and maximum values of the range as well as every value between such minimum and maximum values. Still further, where a range refers to integers, every integer between the minimum and maximum values of such range is included. In addition, where multiple ranges are provided to describe a feature or characteristic, such ranges can be combined. That is to say that, unless otherwise indicated, all ranges disclosed herein are to be understood to encompass any and all sub-ranges subsumed therein. For example, a stated range of from "1 to 10" should be considered to include any and all sub-ranges between the minimum value of 1 and the maximum value of 10. Exemplary sub-ranges of the range 1 to 10 include, but are not limited to, 1 to 6.1, 3.5 to 7.8, and 5.5 to 10, etc.

As used herein, "hydrocarbyl" refers to a group that contains carbon and hydrogen atoms, non-limiting examples being alkyl, cycloalkyl, aryl, aralkyl, alkaryl, and alkenyl. The term "halohydrocarbyl" refers to a hydrocarbyl group where at least one hydrogen has been replaced by a halogen. The term perhalocarbyl refers to a hydrocarbyl group where all hydrogens have been replaced by a halogen.

As used herein, the expression "alkyl" means a saturated, straight-chain or branched-chain hydrocarbon substituent having the specified number of carbon atoms. Particular alkyl groups are methyl, ethyl, n-propyl, isopropyl, tert-butyl, and so on. Derived expressions such as "alkoxy", "thioalkyl", "alkoxyalkyl", "hydroxyalkyl", "alkylcarbonyl", "alkoxycarbonylalkyl", "alkoxycarbonyl", "diphenylalkyl", "phenylalkyl", "phenylcarboxyalkyl" and "phenoxyalkyl" are to be construed accordingly.

As used herein, the expression "cycloalkyl" includes all of the known cyclic groups. Representative examples of "cycloalkyl" includes without any limitation cyclopropyl, cyclobutyl, cyclopentyl, cyclohexyl, cycloheptyl, cyclooctyl, and the like. Derived expressions such as "cycloalkoxy", "cycloalkylalkyl", "cycloalkylaryl", "cycloalkylcarbonyl" are to be construed accordingly.

As used herein, the expression "perhaloalkyl" represents the alkyl, as defined above, wherein all of the hydrogen atoms in said alkyl group are replaced with halogen atoms selected from fluorine, chlorine, bromine or iodine. Illustrative examples include trifluoromethyl, trichloromethyl, tribromomethyl, triiodomethyl, pentafluoroethyl, pentachloroethyl, pentabromoethyl, pentaiodoethyl, and straight-chained or branched heptafluoropropyl, heptachloropropyl, heptabromopropyl, nonafluorobutyl, nonachlorobutyl, undecafluoropentyl, undecachloropentyl, tridecafluorohexyl, tridecachlorohexyl, and the like. Derived expression, "perhaloalkoxy", is to be construed accordingly. It should further be noted that certain of the alkyl groups as described herein, such as for example, "alkyl" may partially be fluorinated, that is, only portions of the hydrogen atoms in said alkyl group are replaced with fluorine atoms and shall be construed accordingly.

As used herein the expression "acyl" shall have the same meaning as "alkanoyl", which can also be represented structurally as "R—CO—," where R is an "alkyl" as defined herein having the specified number of carbon atoms. Additionally, "alkylcarbonyl" shall mean same as "acyl" as defined herein. Specifically, "$(C_1-C_4)$acyl" shall mean formyl, acetyl or ethanoyl, propanoyl, n-butanoyl, etc. Derived expressions such as "acyloxy" and "acyloxyalkyl" are to be construed accordingly.

As used herein, the expression "aryl" means substituted or unsubstituted phenyl or naphthyl. Specific examples of substituted phenyl or naphthyl include o-, p-, m-tolyl, 1,2-, 1,3-, 1,4-xylyl, 1-methylnaphthyl, 2-methylnaphthyl, etc. "Substituted phenyl" or "substituted naphthyl" also include any of the possible substituents as further defined herein or one known in the art.

As used herein, the expression "arylalkyl" means that the aryl as defined herein is further attached to alkyl as defined herein. Representative examples include benzyl, phenylethyl, 2-phenylpropyl, 1-naphthylmethyl, 2-naphthylmethyl and the like.

As used herein, the expression "alkenyl" means a non-cyclic, straight or branched hydrocarbon chain having the specified number of carbon atoms and containing at least one carbon-carbon double bond, and includes ethenyl and straight-chained or branched propenyl, butenyl, pentenyl and hexenyl groups. Derived expression, "arylalkenyl" and five membered or six membered "heteroarylalkenyl" is to be construed accordingly. Illustrative examples of such derived expressions include furan-2-ethenyl, phenylethenyl, 4-methoxyphenylethenyl, and the like.

As used herein, the expression "heteroaryl" includes all of the known heteroatom containing aromatic radicals. Representative 5-membered heteroaryl radicals include furanyl, thienyl or thiophenyl, pyrrolyl, isopyrrolyl, pyrazolyl, imidazolyl, oxazolyl, thiazolyl, isothiazolyl, and the like. Representative 6-membered heteroaryl radicals include pyridinyl, pyridazinyl, pyrimidinyl, pyrazinyl, triazinyl, and the like radicals. Representative examples of bicyclic heteroaryl radicals include, benzofuranyl, benzothiophenyl, indolyl, quinolinyl, isoquinolinyl, cinnolyl, benzimidazolyl, indazolyl, pyridofuranyl, pyridothienyl, and the like radicals.

"Halogen" or "halo" means chlorine or chloro, fluorine or fluoro, bromine or bromo, and iodine or iodo.

As used herein, the expression "ionomer" means an anion conducting solid polymer electrolyte as the ion conducting medium between the two electrodes and the ion conducting medium within the electrodes acting as the ionic conduit between electroactive material and electrolyte.

By the term "actinic radiation" or "photolytic conditions" is meant subjecting the compositions of this invention to suitable "electromagnetic radiation," which can be emitted from a laser, a digital processing (DLP) projector, a lamp, a light emitting diode (LED), a mercury arc lamp, a fiber optic, or liquid crystal display (LCD), and the like.

In a broad sense, the term "substituted" is contemplated to include all permissible substituents of organic compounds. In a few of the specific embodiments as disclosed herein, the term "substituted" means substituted with one or more substituents independently selected from the group consisting of $C_{1-6}$alkyl, $C_{2-6}$alkenyl, $C_{1-6}$perfluoroalkyl, phenyl, hydroxy, —$CO_2H$, an ester, an amide, $C_1$-$C_6$alkoxy, $C_1$-$C_6$thioalkyl, $C_1$-$C_6$perfluoroalkoxy, —$NH_2$, Cl, Br, I, F, —NH-lower alkyl, and —N(lower alkyl)$_2$. However, any of the other suitable substituents known to one skilled in the art can also be used in these embodiments.

By the term "derived" is meant that the polymeric repeating units are mass polymerized (formed) from, for example, polycyclic norbornene-type monomers in accordance with formulae (I), (II) and/or (III) wherein the resulting polymers are formed by 2,3 enchainment of norbornene-type monomers as shown below:

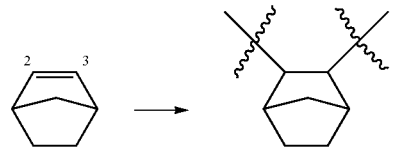

The above polymerization is also known widely as vinyl addition polymerization typically carried out in the presence of organometallic compounds such as organopalladium compounds or organonickel compounds as further described in detail below.

Thus, in accordance with the practice of this invention there is provided a composition comprising:
a) one or more monomers of formula (I):

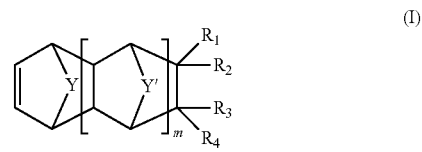

(I)

wherein:
Y and Y' are the same or different and independently of each other selected from the group consisting of —$CH_2$—, —$CH_2$—$CH_2$— and —O—;
m is an integer from 0 to 3;
at least one of $R_1$, $R_2$, $R_3$ or $R_4$ is a group of the formula R—X,
where R is selected from the group consisting of ($C_1$-$C_{10}$)alkylene, ($C_3$-$C_8$)cycloalkylene, ($C_1$-$C_{10}$)alkylene($C_3$-$C_8$)cycloalkylene, ($C_1$-$C_{10}$)alkylene($C_3$-$C_8$)cycloalkylene($C_1$-$C_{10}$)alkylene, ($C_1$-$C_{10}$)alkylene($C_6$-$C_{10}$)arylene and ($C_1$-$C_{10}$)alkylene($C_6$-$C_{10}$)arylene($C_1$-$C_{10}$)alkylene;
X is selected from the group consisting of halogen, hydroxy, ($C_1$-$C_{10}$)alkoxy and ($C_6$-$C_{12}$)aryloxy; and the remaining $R_1$, $R_2$, $R_3$ and $R_4$ are independently of each other selected from the group consisting of hydrogen, methyl, ethyl, linear or branched $(C_3-C_{10})$alkyl, $(C_3-C_8)$cycloalkyl, $(C_1-C_{10})$alkyl$(C_3-C_8)$cycloalkyl and $(C_1-C_{10})$alkyl$(C_6-C_{10})$aryl;

b) one or more monomer of formula (III):

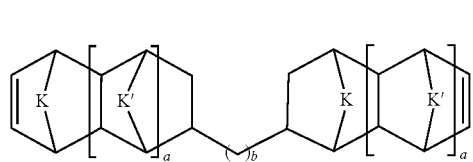

wherein:
a is an integer 0, 1 or 2;
b is an integer from 1 to 10; and
K and K' are the same or different and independently of each other selected from the group consisting of —$CH_2$—, —$CH_2$—$CH_2$—, —O— and —S—;

c) a palladium catalyst selected from the group consisting of a thermally active vinyl addition palladium catalyst and a photoactive vinyl addition palladium catalyst.

It should be noted that in some embodiments the composition of this invention contains only one monomer of formula (I) and only one monomer of formula (III) as described herein. In yet some other embodiments of this invention the composition of this invention contains two different monomers of formula (I) and one monomer of formula (III) as described herein.

Surprisingly, it has now been found that a composition containing a proper amounts of one monomer of formula (I) and one monomer of formula (III) it is now possible to mass polymerize such compositions to form suitably cross-linked polymer which exhibits much needed properties in fabricating a membrane in accordance with this invention as further described below.

In some other embodiments, the composition of this invention further includes one or more monomers of formula (II):

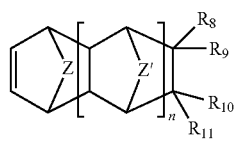

wherein:
Z and Z' are the same or different and independently of each other selected from the group consisting of —$CH_2$—, —$CH_2$—$CH_2$— and —O—;
n is an integer from 0 to 3; and
$R_8$, $R_9$, $R_{10}$ and $R_{11}$ are the same or different and independently of each other selected from the group consisting of hydrogen, methyl, ethyl, linear or branched $(C_3-C_{10})$alkyl, $(C_3-C_8)$cycloalkyl, $(C_1-C_{10})$alkyl$(C_3-C_8)$cycloalkyl and $(C_1-C_{10})$alkyl$(C_6-C_{10})$aryl.

Any of the known vinyl addition polymerization catalysts can be used in the composition of this invention which triggers mass polymerization of the composition either under thermal and/or photolytic conditions. In some embodiments the palladium catalyst employed is a thermally activated catalyst. Non-limiting examples of such catalyst include a palladium compound of formula (IV):

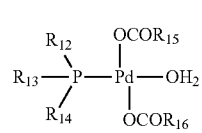

wherein:
at least two of $R_{12}$, $R_{13}$ and $R_{14}$ are the same and is attached to the phosphorus through a tertiary carbon, which is selected from the group consisting of tert-$(C_4-C_{12})$alkyl, 1-$(C_1-C_5)$alkyl$(C_3-C_8)$cycloalkyl, 1-$(C_5-C_{12})$bicycloalkyl and 1-$(C_8-C_{12})$tricycloalkyl, $(C_6-C_{10})$aryl and $(C_6-C_{10})$aryl$(C_1-C_3)$alkyl;

and the remaining $R_{12}$, $R_{13}$ or $R_{14}$ is methyl, ethyl, linear or branched $(C_3-C_{12})$alkyl, $(C_6-C_{10})$aryl and $(C_6-C_{10})$aryl$(C_1-C_3)$alkyl; and $R_{15}$ and $R_{16}$ are the same or different and each independently selected from the group consisting of methyl, ethyl, linear or branched $(C_3-C_{20})$alkyl, trifluoromethyl, pentafluoroethyl, linear or branched $(C_3-C_{20})$ perfluoroalkyl.

Thermally active palladium catalyst also includes an activator compound of formula (VI):

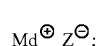

wherein
$M_a^\oplus$ is a cation selected from lithium, sodium, potassium, cesium, barium, ammonium and linear or branched tetra$(C_1-C_4)$alkyl ammonium;
$Z^\ominus$ is a weakly coordinating anion selected from the group consisting of $B(C_6F_5)_4^\ominus$, $B[C_6H_3(CF_3)_2]_4^\ominus$, $B(C_6H_5)_4^\ominus$, $[Al(OC(CF_3)_2C_6F_5)_4]^\ominus$, $BF_4^\ominus$, $PF_6^\ominus$, $AsF_6^\ominus$, $SbF_6^\ominus$, $(CF_3SO_2)_2N^\ominus$, $(CF_3SO_2)_3C^\ominus$ and $CF_3SO_3^\ominus$.

In some other embodiments the palladium catalyst employed is a photoactive palladium catalyst. Any of the known photoactive palladium vinyl addition catalysts can be used in the compositions of this invention. Non-limiting examples of such catalysts include a palladium compound of formula (V):

each occurrence of $R_{17}$ is independently selected from the group consisting of methyl, ethyl, linear or branched $(C_3-C_6)$alkyl and $(C_6-C_{12})$aryl; and
each occurrence of $R_{18}$ is independently selected from the group consisting of $(C_3-C_{10})$cycloalkyl and $(C_6-C_{12})$aryl.

The photoactive composition according to this invention further contains a photoinitiator selected from the group consisting of:

a compound of formula (VII):

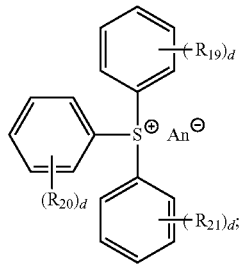

(VII)

a compound of formula (VIII):

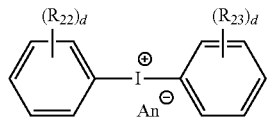

(VIII)

wherein:

d is an integer from 0 to 5;

$An^\ominus$ is selected from the group consisting of $Cl^\ominus$, $Br^\ominus$, $I^\ominus$, $BF_4^\ominus$, tetrakis(pentafluorophenyl)borate, tetrakis(3,5-bis(trifluoromethyl)phenyl)borate, tetrakis(2-fluorophenyl)borate, tetrakis(3-fluorophenyl)borate, tetrakis(4-fluorophenyl)borate, tetrakis(3,5-difluorophenyl)borate, tetrakis(2,3,4,5-tetrafluorophenyl)borate, tetrakis(3,4,5,6-tetrafluorophenyl)borate, tetrakis(3,4,5-trifluorophenyl)borate, methyltris(perfluorophenyl)borate, ethyltris(perfluorophenyl)borate, phenyltris(perfluorophenyl)borate, tetrakis(1,2,2-trifluoroethylenyl)borate, tetrakis(4-tri-1-propylsilyltetrafluorophenyl)borate, tetrakis(4-dimethyl-tert-butylsilyltetrafluorophenyl)borate, (triphenylsiloxy)tris(pentafluorophenyl)borate, (octyloxy)tris(pentafluorophenyl)borate, tetrakis[3,5-bis[1-methoxy-2,2,2-trifluoro-1-(trifluoromethyl)ethyl]pheny-1]borate, tetrakis[3-[1-methoxy-2,2,2-trifluoro-1-(trifluoromethyl)ethyl]-5-(trifluoromethyl)phenyl]borate, tetrakis[3-[2,2,2-trifluoro-1-(2,2,2-trifluoroethoxy)-1-(trifluoromethyl)-ethyl]-5-(trifluoromethyl)phenyl]borate, $PF_6^\ominus$, $SbF_6^\ominus$, $AsF_6^\ominus$, n-$CF_4SO_2)_2N^\ominus$, $(CF_3SO_2)_3C^\ominus$ and $CF_3SO_3^\ominus$.

$R_{19}$, $R_{20}$, $R_{21}$, $R_{22}$ and $R_{23}$ are the same or different and each independently selected from the group consisting of halogen, methyl, ethyl, linear or branched ($C_3$-$C_{20}$) alkyl, ($C_3$-$C_{12}$)cycloalkyl, ($C_6$-$C_{12}$)bicycloalkyl, ($C_7$-$C_{14}$)tricycloalkyl, ($C_6$-$C_{10}$)aryl, ($C_6$-$C_{10}$)aryl($C_1$-$C_3$)alkyl, ($C_1$-$C_{12}$)alkoxy, ($C_3$-$C_{12}$)cycloalkoxy, ($C_6$-$C_{12}$)bicycloalkoxy, ($C_7$-$C_{14}$)tricycloalkoxy, ($C_6$-$C_{10}$)aryloxy($C_1$-$C_3$)alkyl, ($C_6$-$C_{10}$)-aryloxy, ($C_6$-$C_{10}$)thioaryl, ($C_1$-$C_6$)alkanoyl($C_6$-$C_{10}$)thioaryl, ($C_1$-$C_6$)alkoxy($C_6$-$C_{10}$)aroyl($C_1$-$C_6$)alkyl and ($C_6$-$C_{10}$)thioaryl-($C_6$-$C_{10}$)diarylsulfonium salt.

Accordingly, in some embodiments, the composition according to this invention encompasses:

each of m, n and a are 0 or 1;

b is an integer from 3 to 8;

each of Y, Y', Z, Z', K and K' is $CH_2$;

at least one of $R_1$, $R_2$, $R_3$ and $R_4$ is a group of formula R—X, where

R is $(CH_2)_c$, $(CH_2)_c$cyclohexylene, $(CH_2)_c$cyclohexylene $(CH_2)_c$, $(CH_2)_c$phenylene, and $(CH_2)_c$phenylene $(CH_2)_c$, where c is an integer from 1 to 10;

X is bromine:

the remaining $R_1$, $R_2$, $R_3$ and $R_4$ are independently of each other selected from the group consisting of hydrogen, methyl, ethyl, linear or branched propyl, butyl, pentyl, hexyl, cyclopentyl, cyclohexyl, methylcyclopentyl, methylcyclohexyl and benzyl;

$R_8$, $R_9$, $R_{10}$ and $R_{11}$ are independently of each other selected from the group consisting of methyl, ethyl, linear or branched propyl, butyl, pentyl, hexyl, cyclopentyl, cyclohexyl, methylcyclopentyl, methylcyclohexyl and benzyl;

at least two of $R_{12}$, $R_{13}$ and $R_{14}$ are the same and is selected from the group consisting of tert-butyl, 1-norbornyl, 1-bicyclo[2,2,2]octyl and 1-adamantyl; and the remaining $R_{12}$, $R_{13}$ and $R_{14}$ is selected from the group consisting of n-propyl, n-butyl, n-pentyl and n-hexyl;

$R_{15}$ and $R_{16}$ are the same or different and each independently selected from the group consisting of methyl, ethyl, n-propyl and n-butyl;

each occurrence of $R_{17}$ is methyl or ethyl; and each occurrence of $R_{18}$ is selected from the group consisting of cyclopentyl, cyclohexyl, cycloheptyl and phenyl.

In some embodiments, the composition according to this invention employs a compound of formula (VI), wherein $M_d^\oplus$ is lithium; and $Z^\ominus$ is selected from the group consisting of $B(C_6F_5)_4^\ominus$, $B[C_6H_3(CF_3)_2]_4^\ominus$, $B(C_6H_5)_4^\ominus$, $(CF_3SO_2)_2N^\ominus$ and $(CF_3SO_2)_3C^\ominus$.

Generally, as noted, a combination of a compound of formula (VI) with a palladium compound of formula (IV) is used in vinyl addition polymerization carried out under thermal conditions. For example, a composition containing one or more monomers of formula (I), one or more monomers of formula (III), a palladium compound of formula (IV) and a compound of formula (VI), and optionally one or more monomers of formula (II) can be subjected to mass vinyl addition polymerization conditions by heating the composition to suitable temperature to form a solid object including film or a membrane material as described herein. The temperature conditions can range from about 80° C. to 120° C. In some embodiments the temperature used for mass polymerization is from 90° C. to 110° C. However, it should be noted that any temperature condition that affects mass polymerization can be used to form three dimensional objects using the composition of this invention.

Accordingly, it should be noted that the composition of this invention may contain any of the thermally activated palladium compound and/or other catalyst which can bring about the mass vinyl addition polymerization of the composition as described herein. All of such catalyst components are part of this invention. For example, a palladium compound of formula (IVa) is effective as a thermally activated vinyl addition polymerization catalyst.

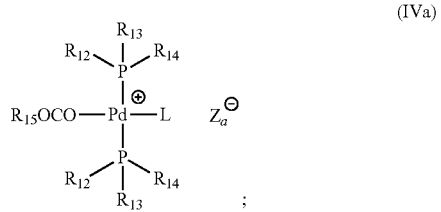

wherein
L is selected from the group consisting of acetonitrile, propionitrile, n-butyronitrile, tert-butyronitrile, benzonitrile ($C_6H_5CN$), 2,4,6-trimethylbezonitrile, phenyl acetonitrile ($C_6H_5CH_2CN$), pyridine, 2-methylpyridine, 3-methylpyridine, 4-methylpyridine, 2,3-dimethylpyridine, 2,4-dimethylpyridine, 2,5-dimethylpyridine, 2,6-dimethylpyridine, 3,4-dimethylpyridine, 3,5-dimethylpyridine, 2,6-di-t-butylpyridine, 2,4-di-t-butylpyridine, 2-methoxypyridine, 3-methoxypyridine, 4-methoxypyridine, pyrazine, 2,3,5,6-tetramethylpyrazine, diethyl ether, di-n-butyl ether, dibenzyl ether, tetrahydrofuran, tetrahydropyran and benzophenone;

$Z_a^{\ominus}$ is selected from the group consisting of $BF_4^{\ominus}$, tetrakis(pentafluorophenyl)borate, tetrakis(3,5-bis(trifluoromethyl)phenyl)borate, tetrakis(2-fluorophenyl)borate, tetrakis(3-fluorophenyl)borate, tetrakis(4-fluorophenyl)borate, tetrakis(3,5-difluorophenyl)borate, tetrakis(2,3,4,5-tetrafluorophenyl)borate, tetrakis(3,4,5,6-tetrafluorophenyl)borate, tetrakis(3,4,5-trifluorophenyl)borate, methyltris(perfluorophenyl)borate, ethyltris(perfluorophenyl)borate, phenyltris(perfluorophenyl)borate, tetrakis(1,2,2-trifluoroethylenyl)borate, tetrakis(4-tri-1-propylsilyltetrafluorophenyl)borate, tetrakis(4-dimethyl-tert-butylsilyltetrafluorophenyl)borate, (triphenylsiloxy)tris(pentafluorophenyl)borate, (octyloxy)tris(pentafluorophenyl)borate, tetrakis[3,5-bis[1-methoxy-2,2,2-trifluoro-1-(trifluoromethyl)ethyl]phenyl]borate, tetrakis[3-[1-methoxy-2,2,2-trifluoro-1-(trifluoromethyl)ethyl]-5-(trifluoromethyl)phenyl]borate, and tetrakis[3-[2,2,2-trifluoro-1-(2,2,2-trifluoroethoxy)-1-(trifluoromethyl)-ethyl]-5-(trifluoromethyl)phenyl]borate, $PF_6^{\ominus}$, $SbF_6^{\ominus}$, $AsF_6^{\ominus}$, n-$C_4F_9SO_3^{\ominus}$, $CF_3SO_3^{\ominus}$ p-$CH_3(C_6H_4)$—$SO_3^{\ominus}$, $(CF_3SO_2)_2N^{\ominus}$ and $((CF_3SO_2)_3C^{\ominus}$;

$R_{12}$, $R_{13}$, $R_{14}$ and $R_{15}$ are as described herein.

In some other embodiments the composition of this invention is mass polymerized under photolytic conditions. That is to say that the composition of this invention undergoes mass vinyl addition polymerization when subjected to suitable actinic radiation. In order to facilitate such mass polymerization, the palladium compound used in the composition must be sensitive to such radiation exposure so as to trigger the mass polymerization conditions. Accordingly, in some embodiments the palladium compound employed in the composition is a palladium compound of formula (V) which when exposed to suitable radiation under certain conditions becomes active to affect mass vinyl addition polymerization. Generally, such conditions can include one or more photoactive compounds, i.e., one or more photoinitiators as noted above and/or photosensitizers.

In some embodiments, the composition of this invention additionally contains a photosensitizer compound which further facilitates the formation of the active catalyst when the composition is exposed to suitable radiation in the presence of the photoinitiator as employed herein. For this purpose, any suitable sensitizer compound can be employed in the compositions of the present invention, when required, which activates the photoinitiator and/or the palladium compound of formula (V). Such suitable sensitizer compounds include, anthracenes, phenanthrenes, chrysenes, benzpyrenes, fluoranthenes, rubrenes, pyrenes, xanthones, indanthrenes, thioxanthen-9-ones, and mixtures thereof. In some exemplary embodiments, suitable sensitizer components is selected from the group consisting of a compound of formula (IX) and a compound of formula (X):

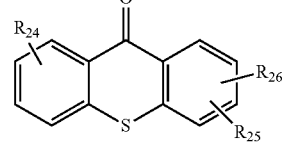

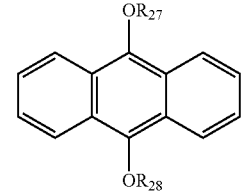

wherein
$R_{24}$, $R_{25}$ and $R_{26}$ are the same or different and independently of each other selected from the group consisting of hydrogen, halogen, hydroxy, $NO_2$, $NH_2$, methyl, ethyl, linear or branched ($C_3$-$C_{12}$)alkyl, ($C_3$-$C_{12}$)cycloalkyl, ($C_6$-$C_{12}$)bicycloalkyl, ($C_7$-$C_{14}$)tricycloalkyl, ($C_6$-$C_{10}$)aryl, ($C_6$-$C_{10}$)aryl($C_1$-$C_3$)alkyl, ($C_1$-$C_{12}$)alkoxy, ($C_3$-$C_{12}$)cycloalkoxy, ($C_6$-$C_{12}$)bicycloalkoxy, ($C_7$-$C_{14}$)tricycloalkoxy, ($C_6$-$C_{10}$)aryloxy($C_1$-$C_3$)alkyl, ($C_6$-$C_{10}$)-aryloxy, C(O)($C_1$-$C_6$)alkyl, COOH, C(O)O ($C_1$-$C_6$)alkyl, and $SO_2$($C_6$-$C_{10}$)aryl;

$R_{27}$ and $R_{28}$ are the same or different and independently of each other selected from the group consisting of methyl, ethyl, linear or branched ($C_3$-$C_{12}$)alkyl, ($C_3$-$C_{12}$)cycloalkyl, ($C_6$-$C_{12}$)bicycloalkyl, ($C_7$-$C_{14}$)tricycloalkyl, ($C_6$-$C_{10}$)aryl and ($C_6$-$C_{10}$)aryl($C_1$-$C_3$)alkyl.

Additionally, it should be noted that any of the palladium compounds or other catalyst systems which affect mass vinyl addition polymerization under thermal and/or photolytic conditions can be employed in the composition of this invention. That is to say that when the composition of this invention is used for forming a membrane in accordance with this invention, which requires thermal conditions, a thermally active catalyst is used for affecting the mass polymerization. On the other hand, when the composition is used to form an object such as a membrane in accordance with this invention which requires photolytic conditions, a photoactive catalyst is employed to affect the mass polymerization.

Various photoactive palladium compounds containing compositions are known in the literature which are effective as UV active catalysts to be used in the composition of this invention. For example, see copending U.S. patent application Ser. No. 17/854,026. Also see, U.S. Patent Application Publication No. US-2021-0198392-A1; and U.S. Patent Application Publication No. US-2021-0198393-A1; pertinent portions of all of which are incorporated herein by reference.

Representative examples of monomer of formula (I) employed in the composition of this invention, without any limitation, may be enumerated as follows:
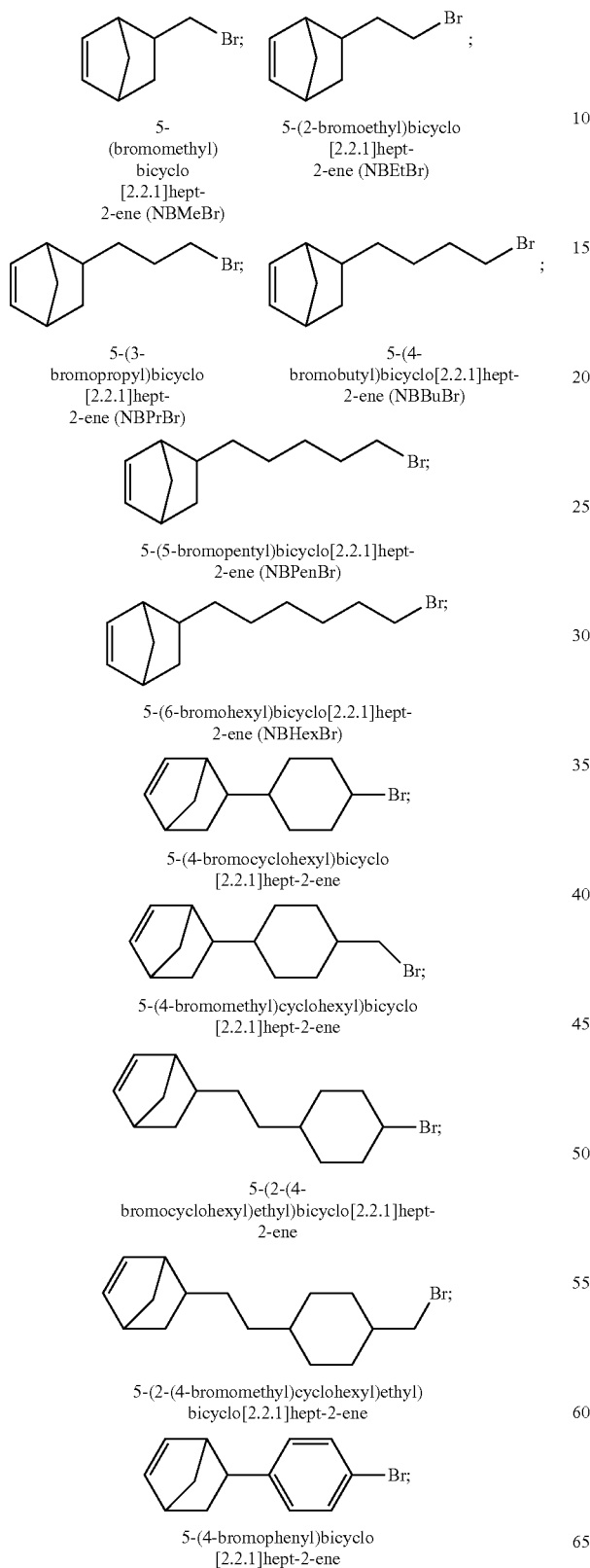
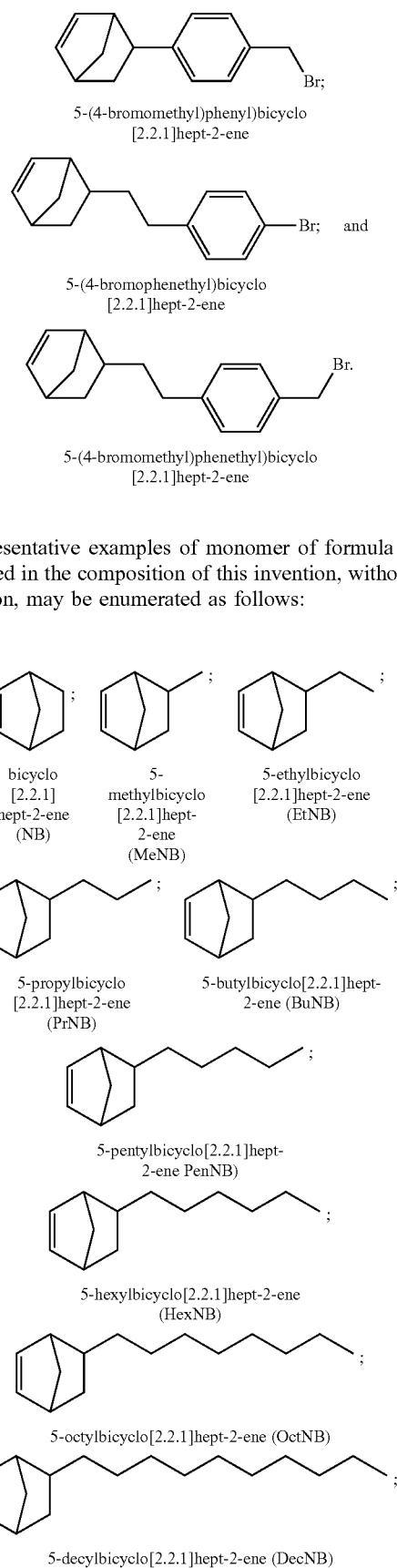
Representative examples of monomer of formula (II) if employed in the composition of this invention, without any limitation, may be enumerated as follows:

-continued
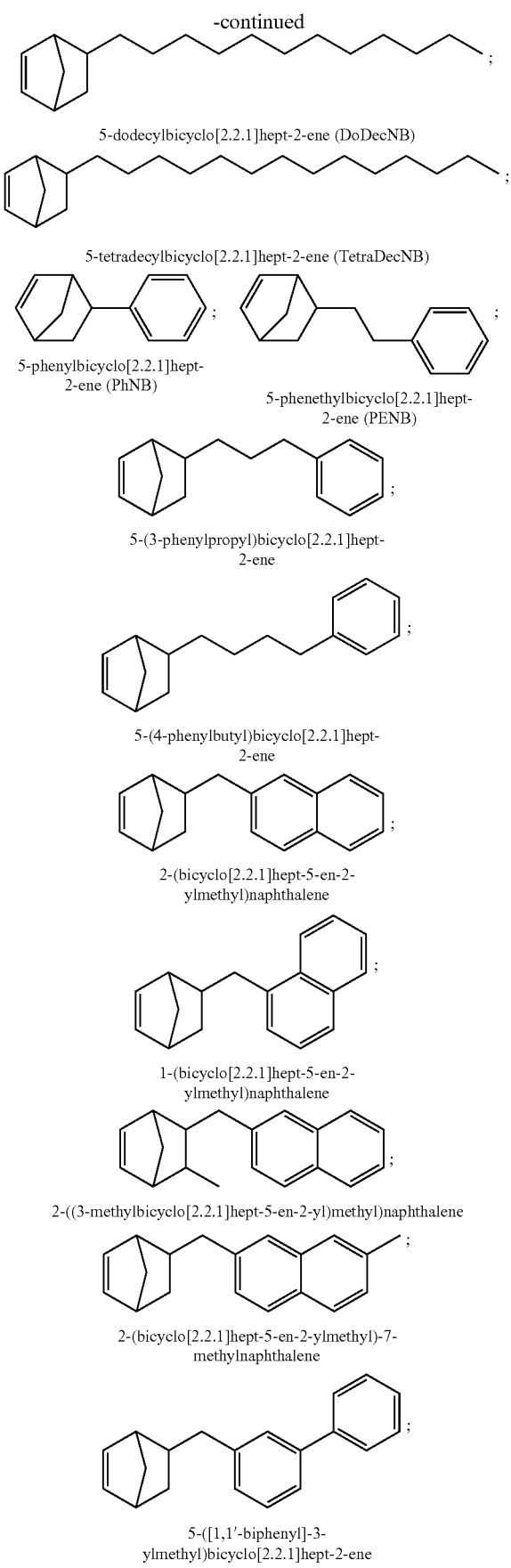
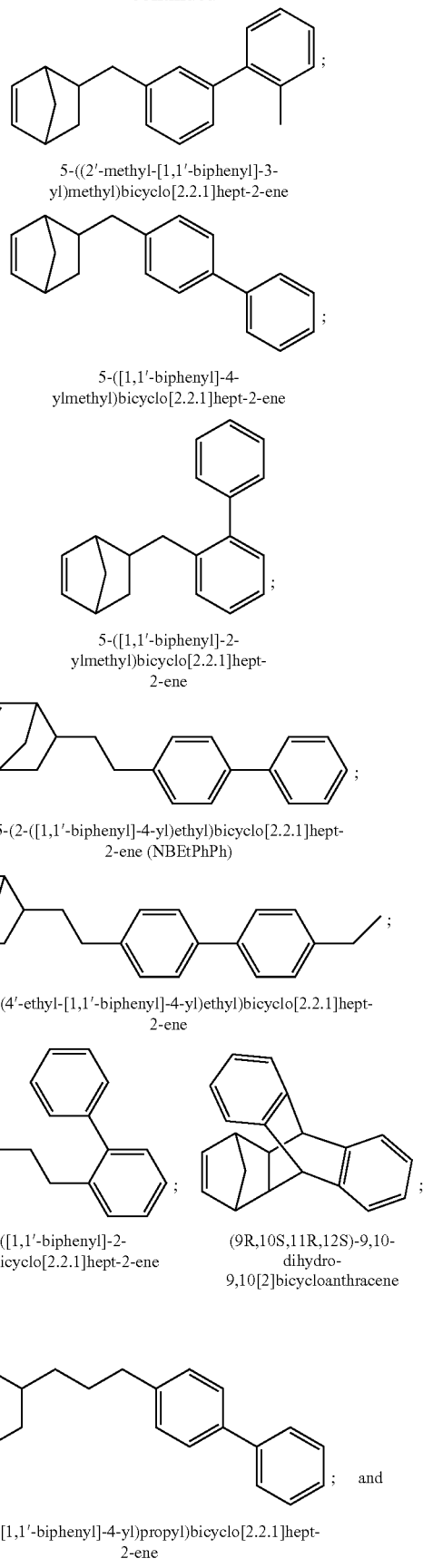

-continued

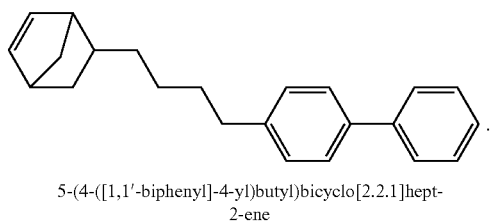

5-(4-([1,1'-biphenyl]-4-yl)butyl)bicyclo[2.2.1]hept-2-ene

Representative examples of monomer of formula (III) employed in the composition of this invention, without any limitation, may be enumerated as follows:

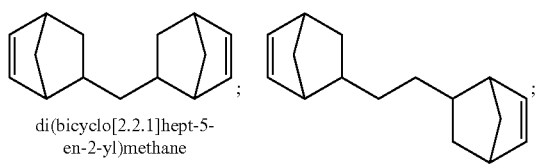

di(bicyclo[2.2.1]hept-5-en-2-yl)methane 1,2-di(bicyclo[2.2.1]hept-5-en-2-yl)ethane

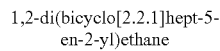

1,3-di(bicyclo[2.2.1]hept-5-en-2-yl)propane

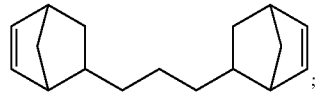

1,4-di(bicyclo[2.2.1]hept-5-en-2-yl)butane (NBBuNB)

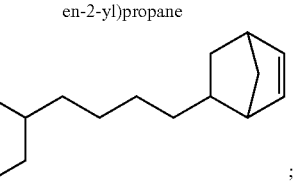

1,5-di(bicyclo[2.2.1]hept-5-en-2-yl)pentane

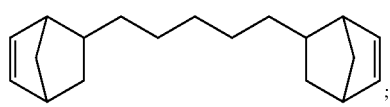
; and 1,6-di(bicyclo[2.2.1]hept-5-en-2-yl)hexane

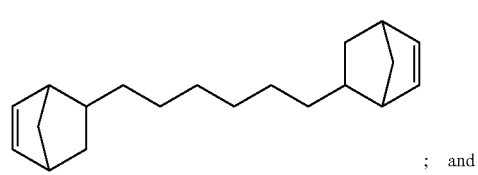

1,8-di(bicyclo[2.2.1]hept-5-en-2-yl)octane (NBOctylNB)

Non-limiting representative examples of palladium compound of formula (IV) is selected from the group consisting of:

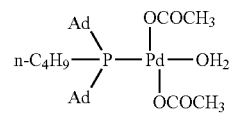

n-butyldi-1-adamantylphosphine palladium diacetate (H$_2$O) (Pd601);

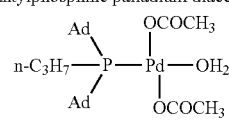

n-propyldi-1-adamantylphosphine palladium diacetate (H$_2$O);

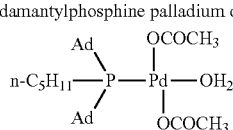

n-pentyldi-1-adamantylphosphine palladium diacetate (H$_2$O);

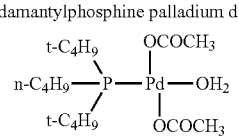

n-butyldi-tert-butylphosphine palladium diacetate (H$_2$O) (Pd445);

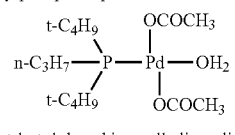

n-propyldi-tert-butylphosphine palladium diacetate (H$_2$O);

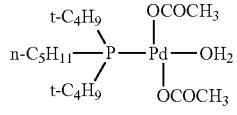

n-pentyldi-tert-butylphosphine palladium diacetate (H$_2$O);

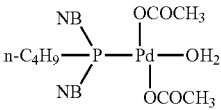

n-butyldi-1-norbornanylphosphine palladium diacetate (H$_2$O); and

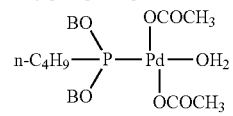

n-butyldi-1-bicyclo[2,2,2]octylphosphine palladium diacetate (H$_2$O).

Representative examples of palladium compound of formula (V), without any limitation, is selected from the group consisting of:
palladium diacetate bis(tricyclopentylphosphine);
palladium diacetate bis(tricyclohexylphosphine) (Pd785);
palladium diacetate bis(tricycloheptylphosphine); and
palladium diacetate bis(triphenylphosphine).

Non-limiting examples of the compound of formula (VI), without any limitation is selected from the group consisting of:
lithium tetrafluoroborate;
lithium triflate;
lithium tris(trifluoromethylsulfonyl)methanide;
lithium tetrakis(pentafluorophenyl)borate (LiFABA);
lithium tetraphenylborate;
lithium tetrakis(3,5-bis(trifluoromethyl)phenyl)borate;

lithium tetrakis(2-fluorophenyl)borate;
lithium tetrakis(3-fluorophenyl)borate;
lithium tetrakis(4-fluorophenyl)borate;
lithium tetrakis(3,5-difluorophenyl)borate;
lithium hexafluorophosphate;
lithium hexaphenylphosphate;
lithium hexakis(pentafluorophenyl)phosphate;
lithium hexafluoroarsenate;
lithium hexaphenylarsenate;
lithium hexakis(pentafluorophenyl)arsenate;
lithium hexakis(3,5-bis(trifluoromethyl)phenyl)arsenate;
lithium hexafluoroantimonate;
lithium hexaphenylantimonate;
lithium hexakis(pentafluorophenyl)antimonate;
lithium hexakis(3,5-bis(trifluoromethyl)phenyl)antimonate;
lithium tetrakis(pentafluorophenyl)aluminate;
lithium tris(nonafluorobiphenyl)fluoroaluminate;
lithium (octyloxy)tris(pentafluorophenyl)aluminate;
lithium tetrakis(3,5-bis(trifluoromethyl)phenyl)aluminate;
lithium methyltris(pentafluorophenyl)aluminate;
N,N-dimethylaniliniumtetrakis(pentafluorophenyl)-borate (DANFABA).

Representative examples of the compound of formula (VII), without any limitation, is selected from the group consisting of:

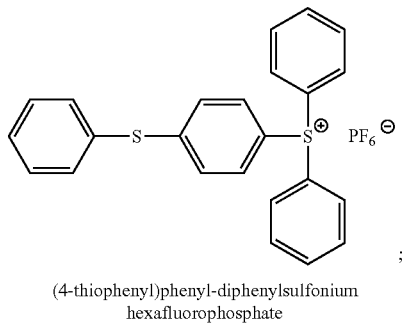

(4-thiophenyl)phenyl-diphenylsulfonium hexafluorophosphate

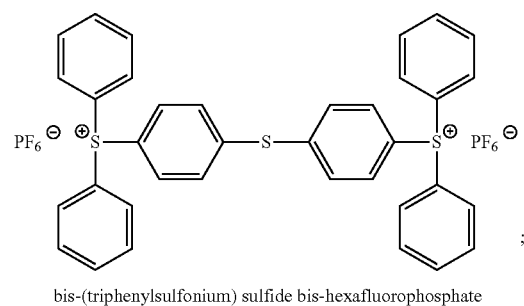

bis-(triphenylsulfonium) sulfide bis-hexafluorophosphate

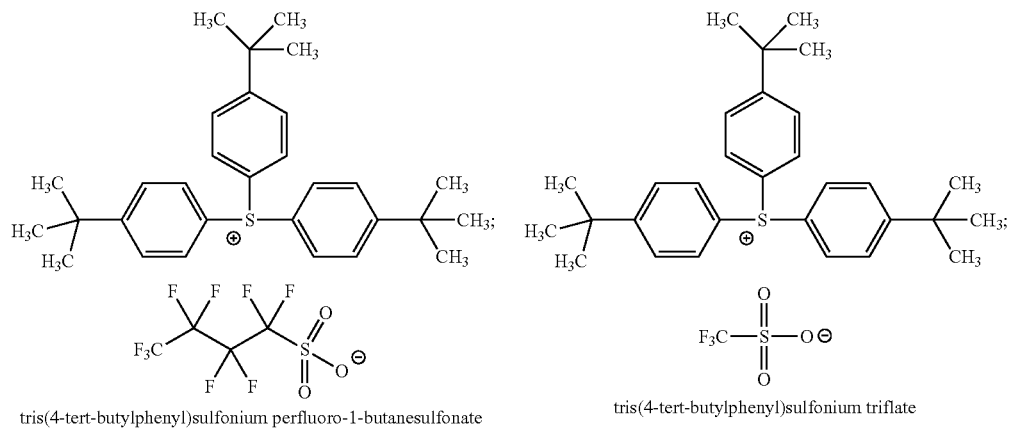

tris(4-tert-butylphenyl)sulfonium perfluoro-1-butanesulfonate tris(4-tert-butylphenyl)sulfonium triflate

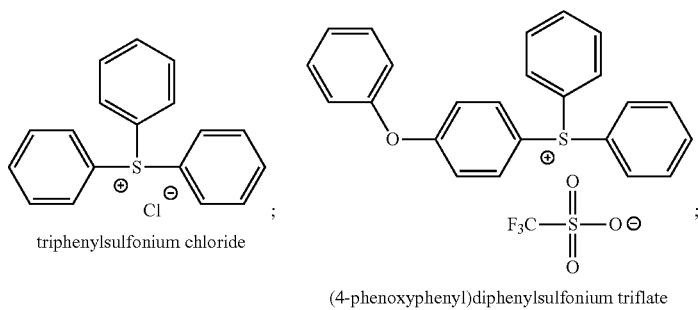

triphenylsulfonium chloride (4-phenoxyphenyl)diphenylsulfonium triflate

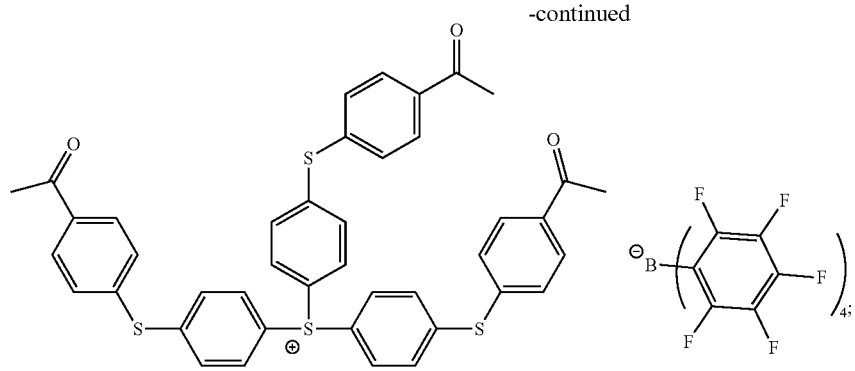

tris(4-((4-acetylphenyl)thio)phenyl)sulfonium tetrakis-pentafluorophenylborate (Irgacure PAG 290)

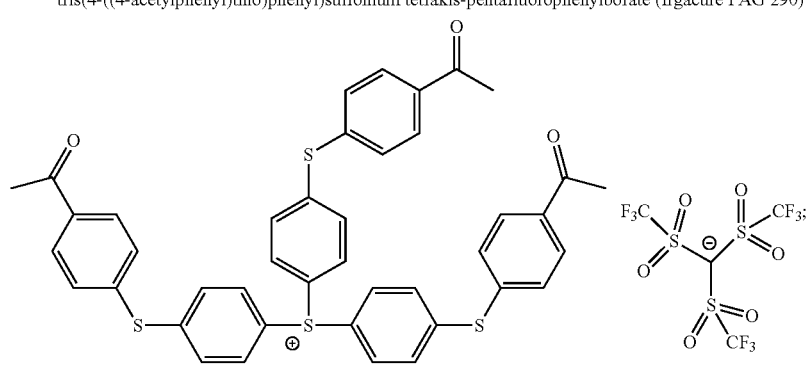

tris(4-((4-acetylphenyl)thio)phenyl)sulfonium tris(trifluoromethylsulfonyl)methanide

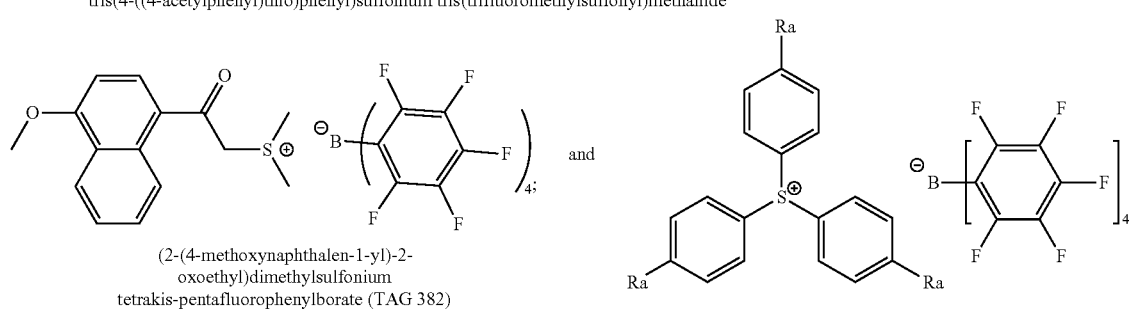

(2-(4-methoxynaphthalen-1-yl)-2-oxoethyl)dimethylsulfonium tetrakis-pentafluorophenylborate (TAG 382)

and tri(4-alkylphenyl)sulfonium tetrafluoroborates, where each $R_a$ is independently selected from linear or branched $(C_{10}\text{-}C_{13})$alkyl, are commercially available under the tradename CPI® 300 or 400 series from San-Apro Ltd.

Representative examples of the compound of formula (VIII), without any limitation, is selected from the group consisting of:

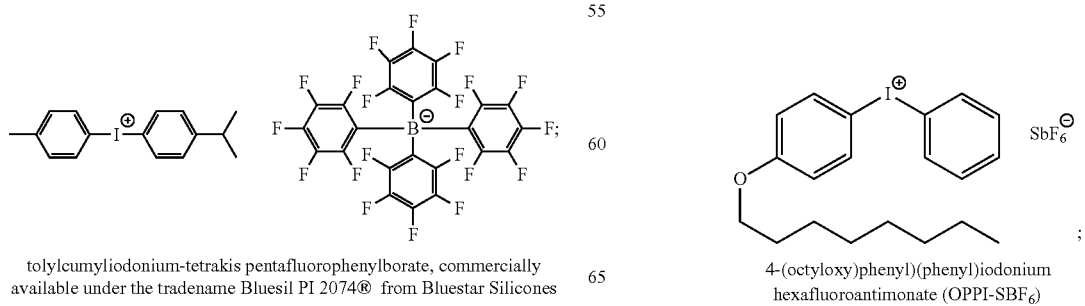

tolylcumyliodonium-tetrakis pentafluorophenylborate, commercially available under the tradename Bluesil PI 2074® from Bluestar Silicones -continued

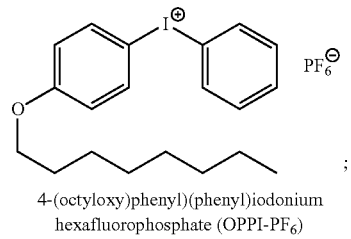

4-(octyloxy)phenyl)(phenyl)iodonium hexafluorophosphate (OPPI-PF$_6$)

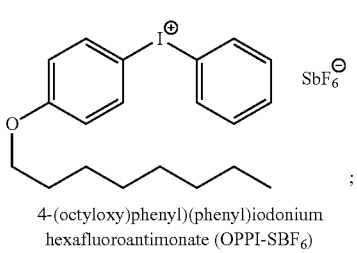

4-(octyloxy)phenyl)(phenyl)iodonium hexafluoroantimonate (OPPI-SBF$_6$)

-continued

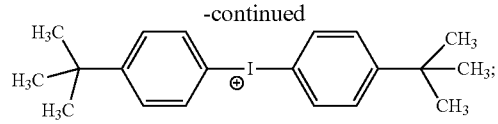

bis(4-tert-butylphenyl)iodonium perfluoro-1-butanesulfonate

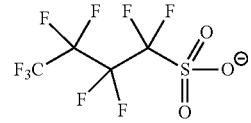

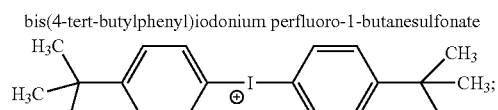

bis(4-tert-butylphenyl)iodonium p-toluenesulfonate

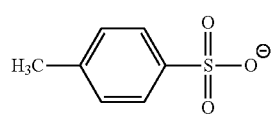

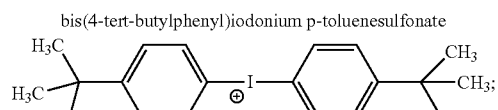

bis(4-tert-butylphenyl)iodonium triflate

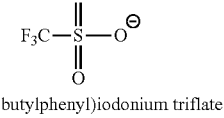

where $R_{42}$ and $R_{43}$ are the same or different and each independently selected from linear or branched ($C_{10}$-$C_{13}$)alkyl; and

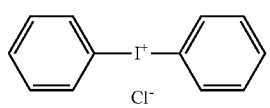

diphenyliodonium chloride

Representative examples of the compound of formula (IX), without any limitation, is selected from the group consisting of:

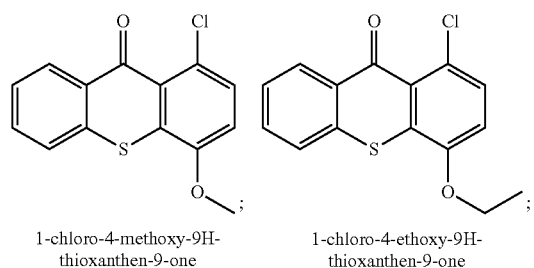

1-chloro-4-methoxy-9H-thioxanthen-9-one

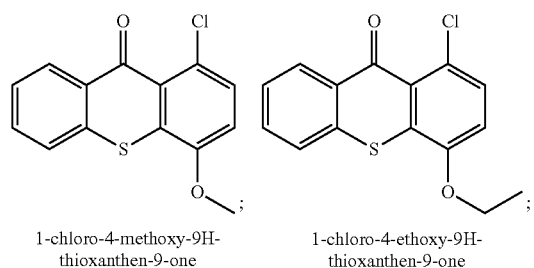

1-chloro-4-ethoxy-9H-thioxanthen-9-one

-continued

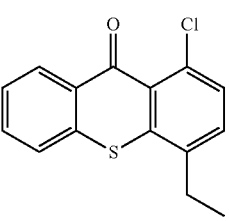

1-chloro-4-propoxy-9H-thioxanthen-9-one

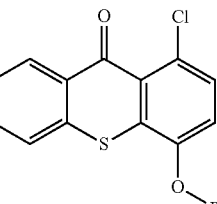

1-chloro-2-propoxy-9H-thioxanthen-9-one

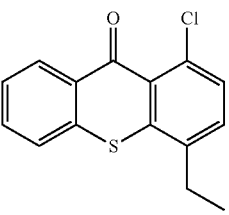

1-chloro-2-ethoxy-9H-thioxanthen-9-one

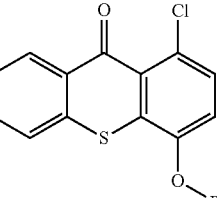

1-chloro-2-methoxy-9H-thioxanthen-9-one 1-chloro-4-methly-9H-thioxanthen-9-one

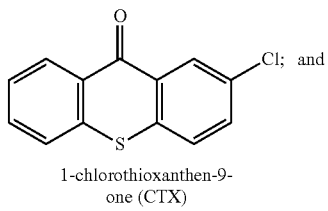

1-chloro-4-ethyl-9H-thioxanthen-9-one 1-chloro-4-phenoxy-9H-thioxanthen-9-one

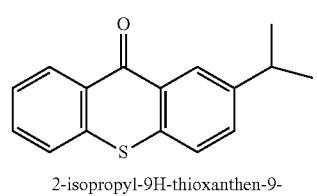

1-chlorothioxanthen-9-one (CTX)

and

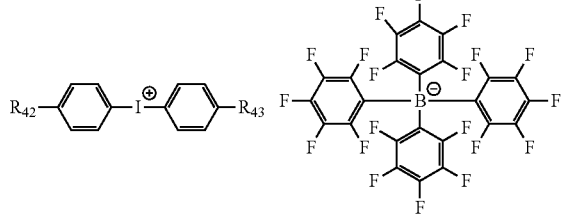

2-isopropyl-9H-thioxanthen-9-one (ITX)

Representative examples of the compound of formula (X), without any limitation, is selected from the group consisting of:

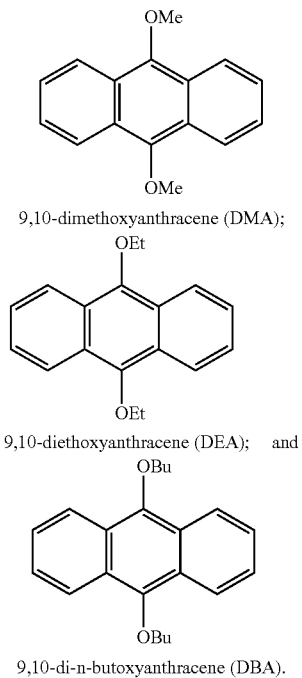

9,10-dimethoxyanthracene (DMA);

9,10-diethoxyanthracene (DEA); and 9,10-di-n-butoxyanthracene (DBA).

Various exemplary compositions of this invention without any limitation may be enumerated as follows:

- a mixture of 5-propylbicyclo[2.2.1]hept-2-ene, 1,4-di(bicyclo[2.2.1]hept-5-en-2-yl)propane, 5-(3-bromopropyl)bicyclo[2.2.1]hept-2-ene, n-butyldi-1-adamantylphosphine palladium diacetate(H$_2$O) (Pd601) and lithium (diethyl ether) tetrakis(pentafluorophenyl)borate (LiFABA);
- a mixture of 5-butylbicyclo[2.2.1]hept-2-ene (BuNB), 1,4-di(bicyclo[2.2.1]hept-5-en-2-yl)butane (NB-BuNB), 5-(4-bromobutyl)bicyclo[2.2.1]hept-2-ene (NBBuBr), n-butyldi-1-adamantylphosphine palladium diacetate(H$_2$O) (Pd601) and lithium (diethyl ether) tetrakis(pentafluorophenyl)borate (LiFABA);
- a mixture of 5-pentylbicyclo[2.2.1]hept-2-ene, 1,4-di(bicyclo[2.2.1]hept-5-en-2-yl)propane, 5-(4-bromobutyl)bicyclo[2.2.1]hept-2-ene, n-butyldi-1-adamantylphosphine palladium diacetate(H$_2$O) (Pd601) and lithium (diethyl ether) tetrakis(pentafluorophenyl)borate (LiFABA);
- a mixture of 5-butylbicyclo[2.2.1]hept-2-ene (BuNB), 1,4-di(bicyclo[2.2.1]hept-5-en-2-yl)butane (NB-BuNB), 5-(4-bromobutyl)bicyclo[2.2.1]hept-2-ene (NBBuBr), palladium diacetate bis(tricyclohexylphosphine) (Pd785), tolylcumyliodonium-tetrakis pentafluorophenylborate and 2-isopropyl-9H-thioxanthen-9-one;
- a mixture of 1,4-di(bicyclo[2.2.1]hept-5-en-2-yl)butane (NBBuNB), 5-(4-bromobutyl)bicyclo[2.2.1]hept-2-ene (NBBuBr), n-butyldi-1-adamantylphosphine palladium diacetate(H$_2$O) (Pd601) and lithium (diethyl ether) tetrakis(pentafluorophenyl)borate (LiFABA); and
- a mixture of 1,8-di(bicyclo[2.2.1]hept-5-en-2-yl)octane (NBOctylNB), 5-(4-bromobutyl)bicyclo[2.2.1]hept-2-ene (NBBuBr), n-butyldi-1-adamantylphosphine palladium diacetate(H$_2$O) (Pd601) and lithium (diethyl ether) tetrakis(pentafluorophenyl)borate (LiFABA).

Advantageously it has now been found that a proper combination of the composition as described herein can be used in the fabrication of a variety of electronic and/or electrochemical devices, among various other industrially useful products. In some embodiments the composition of this invention is comprised of at least one monomer of formula (I) and at least one monomer of formula (III) and a thermally active vinyl addition polymerization catalyst. Any of the known thermally active vinyl addition polymerization catalyst can be employed in the composition of this invention intended for such purposes. An exemplary thermally active vinyl addition polymerization catalyst is of the compound of formula (IV), which is used in combination with a compound of formula (VI). The thermally active composition of this invention when subjected to suitable temperatures undergoes mass vinyl addition polymerization to form three dimensional objects such as, for example, films.

Similarly, the composition of this invention can also be tailored to form three dimensional objects when subjected to suitable actinic radiation. Accordingly, in some embodiments the composition of this invention contains at least one monomer of formula (I) and at least one monomer of formula (III) and a photoactive vinyl addition polymerization catalyst. Any of the known photoactive vinyl addition polymerization catalyst can be employed in the composition of this invention intended for such purposes. An exemplary photoactive vinyl addition polymerization catalyst is of the compound of formula (V), which is generally used in combination with at least one compound of formulae (VII) or (VIII). The photoactive composition of this invention when subjected to suitable actinic radiation undergoes mass vinyl addition polymerization to form three dimensional objects such as for example films.

As noted, surprisingly, it has now been found that employing a suitable combination of at least one compound of formula (I) and at least one compound of formula (III) in combination with photoactive palladium catalyst such as for example a compound of formula (V) and at least one compound of formulae (VII) or (VIII) can trigger the mass vinyl addition polymerization when the composition is subjected to a suitable actinic radiation, generally at wavelengths of from about 240 nm to 410 nm (typically covering the medium to long wave ultraviolet radiation), the composition undergoes mass vinyl addition polymerization to form a solid object such as for example a film.

Surprisingly, it should further be noted that the compositions of this invention are stable at temperatures ranging from sub-ambient (below 20° C.) to room temperature (from about 20° C. to 40° C.), thus offering excellent shelf life stability. As used herein, "stable" means the composition of this invention remains clear without increase of any viscosity when kept at temperatures ranging from sub-ambient to ambient room temperature, as defined herein, especially when kept in a dark atmosphere, such as for example, in amber or brown colored containers in the absence of any light. Accordingly, in some embodiments, the composition of this invention exhibits no viscosity change when stored at temperatures below 20° C. for a period of at least two days. Accordingly, in some embodiments, the composition of this invention exhibits less than five (5) percent viscosity increase when stored at temperatures below 25° C. for a period of from about one hour to six hours. That is, the viscosity of the composition remains essentially unchanged when stored at ambient temperature conditions, yet the composition undergoes mass polymerization as soon as it is exposed to suitable thermal conditions and/or actinic radiation as evidenced by UV-DSC measurements which indicated that the heat of polymerization remained unchanged even after a composition is stored for an extended period of time as disclose hereinabove.

Any amount of palladium compound of formula (IV) for thermally active composition or a palladium compound of formula (V) for photoactive composition can be employed in the composition of this invention which will bring about the intended result. Generally, the combined molar ratios of monomers of formulae (I), (III) and (II), if employed: compound of formulae (IV) or (V) is in the range of 10,000:1 to 5,000:1 or lower. In some other embodiments such molar ratio of monomer:compound of formulae (IV) or (V) is 15,000:1, 20,000:1 or higher. Similarly, any amount of compound of formula (VI) in combination with a palladium compound of formula (IV) can be employed in the thermally active composition of this invention which will bring about the intended result. Generally, the molar ratios of palladium compound of formula (IV):compound of formulae (VI) is in the range of 1:2 to 1:5. Finally, in a photoactive composition of this invention the molar ratio of palladium compound of formula (V): the photoacid generator of formulae (VII) or (VIII):the photosensitizer of formulae (IX) or (X) is in the range of 1:1:0.5 to 1:2:2 or 1:2:1 or 1:4:1, 1:2:4, 1:1:2, 1:4:2 or such ranges which will bring about the intended benefit.

Surprisingly, it has further been found that only by employing proper combination of one or more monomers of formula (I) in combination with one or more monomers of formula (III) it is now possible to obtain anion exchange membranes having the desirable properties. In some embodiments the amount of monomer of formula (III) employed is no more than 0.5 mole percent. In some other embodiments the amount of monomer of formula (III) employed is no more than 1.0 mole percent, no more than 1.5 mole percent, no more than 2.0 mole percent, no more than 2.5 mole percent, or no more than 3.0 mole percent or more depending upon the intended use and application. Accordingly, the molar ratio of monomer of formula (I) to monomer of formula (III) can be from 99.5:0.5 to 95:5. In some embodiments, the molar ratio of monomer of formula (I):monomer of formula (III) is in the range from 99:1 to 96:4; in some other embodiments it is from 98.5:1.5 to 98:2, 97.5:2.5, 97:3, 96:4, and so on. That is to say that by employing as little as 0.5 mole percent of monomer of formula (III) it is now possible to form crosslinked films or supported membranes that exhibit extremely good ion conducting properties, long stabilities, among other benefits that can be attained. It should further be noted that one or more monomers of formula (II) can also be used in the composition of this invention in any desirable amounts depending upon the intended end applications. Accordingly, in some embodiments, either of the thermally active or photoactive compositions as described hereinabove may optionally contain one or more monomers of formula (II) as described herein.

In a further aspect of this invention there is provided a kit for forming an anion exchange membrane. There is dispensed in this kit a composition of this invention. Accordingly, in some embodiments there is provided a kit in which there is dispensed one or more monomers of formula (I) as described herein; one or more monomers of formula (III) as described herein; a palladium compound of formula (IV) as described herein; and a compound of formula (VI) as described herein. Further, the kit may optionally contain one or more monomers of formula (II). In some embodiments the kit of this invention contains one monomer of formula (I), one monomer of formula (II), one monomer of formula (III) in combination with palladium compound of formula (IV) and a compound of formula (VI) in suitable amounts as described herein so as to obtain a desirable result and/or for intended purpose.

In another embodiment of this invention there is provided a kit in which dispensed one or more monomers of formula (I) as described herein; one or more monomers of formula (III) as described herein; a palladium compound of formula (V) as described herein; a photoinitiator of formulae (VII) or (VIII) as described herein, and a photosensitizer of formulae (IX) or (X). Further, the kit may optionally contain one or more monomers of formula (II). In some embodiments the kit of this invention contains one monomer of formula (I), one monomer of formula (II), one monomer of formula (III) in combination with palladium compound of formula (V) as described herein; a photoinitiator of formulae (VII) or (VIII) as described herein, and a photosensitizer of formulae (IX) or (X).

In another aspect of this embodiment of this invention the kit of this invention undergoes mass polymerization only when exposed to suitable temperature conditions or exposure to suitable actinic radiation for a sufficient length of time to form a polymeric film. That is to say that the composition of this invention is poured onto a surface or onto a substrate which needs to be encapsulated and exposed to suitable thermal conditions and/or radiation in order for the monomers to undergo polymerization to form a solid transparent polymer which could be in the form of a transparent film.

In some embodiments, the kit as described herein encompasses various exemplary compositions as described hereinabove.

Advantageously it has now been found that employing a proper combination of at least one monomer of formula (I) with at least one monomer of formula (III) optionally in combination with one or more monomers of formula (II) it is now possible to form a mass polymerized polymeric material which imparts unique properties to the membranes made therefrom. Accordingly, in this aspect of the invention there is provided a method for the formation of an anion exchange membrane according to this invention comprising:
forming a solution comprising:
a) one or more monomers of formula (I) as described herein;
b) one or more monomers of formula (III) as described herein;
c) a palladium compound of formula (IV) as described herein in combination with a compound of formula (VI) as described herein; or
a palladium compound of formula (V) as described herein in combination with at least one compound of formulae (VII) or (VIII) further in combination with a compound of formulae (IX) or (X) as described herein;
coating said solution onto a membrane support;
heating the coated membrane support to a temperature from about 80° C. to about 120° C. for about 30 minutes to about 90 minutes;
treating the heated membrane support with tri-($C_1$-$C_4$) alkylamine at a temperature from about 20° C. to about 50° C. for about 1 day to about 5 days to form a quaternized anion exchange membrane; and
washing the quaternized anion exchange membrane with water; and
soaking the quaternized anion exchange membrane in alkali solution to form the anion exchange membrane.

As noted, any of the composition containing at least one monomer of formula (I), where X is bromine, in combination with at least one monomer of formula (III) optionally in combination with one or more monomers of formula (II) as described herein can be used to make the membranes of this invention. In order to form thermally cured membrane, the composition additionally contains a palladium compound of formula (IV) and a compound of formula (VI) or any other known thermally active catalyst as described hereinabove. In order to form photo cured membrane, the composition additionally contains a palladium compound of formula (V) as described herein in combination with at least one compound of formulae (VII) or (VIII) further in combination with a compound of formulae (IX) or (X) as described herein or any other known thermally active catalyst as described hereinabove.

First, a homogeneous solution of the composition is formed by mixing all of the components in desirable amounts as described above. Generally, there is no need to employ additional solvents as the monomers of formulae (I) or (III), and monomer of formula (II) are in the liquid form and may serve as solvents for the catalyst and other components employed. However, in some situations the catalyst may be dissolved in a solvent and mixed with the monomers employed. In such situations, any of the solvents that would dissolve the catalyst system can be employed. Examples of such solvents include alkanes, cycloalkanes, aromatics, such as toluene, ester solvents such as ethyl acetate, THF, dichloromethane, dichloroethane, and the like, or mixtures in any combination thereof.

The solution is then coated onto a suitable membrane support using any of the methods known in the art. Representative examples of coating methods include without any limitation dip-coating, spraying, doctor blading, meniscus coating, ink jet coating and slot coating. The mixture can also be poured onto a substrate to form a membrane film. Suitable substrate includes any appropriate substrate as is, or may be used for forming a membrane. Exemplary membrane supports include without any limitation polypropylene (PP), multilayer polypropylene/polyethylene (PP/PE) and polytetrafluoroethylene (PTFE) based membrane supports. Some of the membrane supports can also be laminated on to a polymeric film. For example, PTFE polymer laminated to a polypropylene support is available commercially as PTFE filters. In such cases, PTFE is expanded into a three-dimensional web-like structure to create billions of microscopic pores. The surfaces can also be made hydrophobic and/or hydrophilic by appropriate chemical treatments. For example, PTFE hydrophobic membrane supports are available commercially as POREX VITEK® from Porex Filtration Group. Various PTFE membrane supports are also available commercially from Sterlitech as well as from Millipore Sigma under the tradename OMNIPORE®, among others. Similarly, various forms of PP membrane supports are also commercially available. For example, various forms of microporous monolayer PP or trilayer PP/PE membrane supports are available commercially from Celgard, LLC.

The membrane supports can be in any of the forms including without limitation sheets or tubes suitable for use in the intended applications. Generally, the membrane support is in the form of a sheet, which as noted above can be laminated onto another support layer or a multilayer support as described herein.

As noted, the composition of this invention is generally coated onto a suitable membrane support by dip coating. Advantageously, it has now been found that dip coating a membrane support with the composition and laminating the coated membrane support with suitable material imparts improved properties to the resulting membrane. In this fabrication method a trilayer laminate of a coated membrane support is formed. Any of the laminate layers suitable to laminate a membrane support can be used for this purpose. Examples of such laminating layers include without any limitation polycarbonate or polyethyleneterephthalate (PET) films. Generally, the coated membrane support is sandwiched between two sheets of the laminate layers to form a laminated membrane sheet. However, various modifications that is well known to one ordinary skilled in the art can also be employed.

Any of the excess coating on the membrane support is gently squeezed out by suitable means such as by doctor blade and the like. This step will not only ensure excess composition on the support is removed but also ensures uniform coating of the membrane support. Then the laminated membrane support is heated to a suitable temperature to trigger mass polymerization of the composition of this invention. Any of the temperature conditions that will bring about such mass polymerization can be employed herein. Generally, the laminated sheets are heated to 80° C. to 120° C. for sufficient length of time to ensure complete mass polymerization of the composition. Generally, the time to fully mass polymerize the composition may take up to one hour or longer, ranging from 30 minutes to 2 hours. After which time the laminate layers are peeled off from the membrane support. It is interesting to note that the thickness of the membrane support before and after modification generally does not change, however, the weight of the support always increases. This suggests that sufficient amount of the composition penetrates the porous sites of the support and thus forming a uniformly fully coated three dimensional membrane support, thus enhancing the properties of the membrane which is unattainable by any of the prior art methods. In some embodiments the amount of coating of the porous surfaces of the support is at least sixty percent of the available surface area, in some other embodiments it is at least about seventy percent or eighty percent or more. The uniform coating of the support and extent of coating can be measured by any of the known methods in the art. For example, scanning electron microscope (SEM) can be used to measure both thickness of the coating as well as the uniformity, among other techniques.

If the composition employed to coat the membrane support contains a photoactivated palladium catalyst, the coated laminate as described herein is exposed to suitable actinic radiation as described herein to affect the mass polymerization of the composition.

It has now been found that the mass polymerized polymers formed from the composition of this invention are insoluble in any of the solvents. This suggests that the mass polymerized polymers have attained such high molecular weights they become insoluble in most of the commonly used solvents, which otherwise would dissolve the polymers formed by other methods, such as solvent assisted vinyl addition polymerization methods. That is to say that the coated membrane supports have a coating of the polymer whose number average molecular weight ($M_n$) may be higher than 500,000. In yet another embodiment, the mass polymerized polymer on the membrane support has a $M_n$ of more than 1,000,000. Generally, the larger the $M_n$, the more stable the polymer coated membrane support.

Next, the fully cured membrane support is suitably treated to introduce ionic pendent group so as to impart anion exchange ability to the membrane, that is, to form anion exchange membrane. Generally, such ionic pendent groups include quaternary ammonium ion, among other groups. In order to form the quaternary ammonium ion containing membrane, advantageously, the composition contains at least one monomer of formula (I), where X is a halogen atom. If another type of monomer of formula (I), as described herein, is used to form the membrane support, which can then suitably be treated to form a pendent group which is halogen.

The membrane support is then reacted with a suitable tri-($C_1$-$C_4$)alkylamine to form the quaternary tri-($C_1$-$C_4$) alkylammonium bromide. Non-limiting examples of tri-($C_1$-$C_4$)alkyl-amine include trimethylamine, dimethylethylamine, methyl-diethylamine, triethylamine, tri-n-propylamine, tributylamine, and the like. Various other tertiary amines substituted with suitable cycloalkyl or phenyl groups can also be employed. It should also be noted that ammonia, primary amines and secondary amines can also be used to form the quaternary ammonium pendent groups. Examples of primary amine include without any limitation methylamine, ethylamine, n-propylamine, n-, sec- and tert-butylamine, and the like. Examples of secondary amine include without any limitation dimethylamine, methylethylamine, diethylamine, di-n-propylamine, di-n-, di-sec- and di-tert-butylamine, and the like. It should further be noted that a certain of the diamines as disclosed hereinbelow may also be used for quaternarization along with certain level of surface crosslinking as further discussed in detail below.

Quaternarization can be carried out by any of the methods known in the art. Generally, the coated and fully cured membrane support formed from a composition containing a monomer of formula (I), where X is halogen, such as for example bromine or chlorine, is reacted with tri-($C_1$-$C_4$) alkylamine suitably in the aqueous medium for a sufficient length of time to form the quaternized ammonium halide (bromide or chloride) pendent groups. The concentration of tri-($C_1$-$C_4$)alkylamine in water (or a suitable alcohol, such as for example, methanol, ethanol, isopropanol, and the like) is not so critical and can range from about 50 weight percent to 90 weight percent. In some instances, the reaction can also be carried out neat in tri-($C_1$-$C_4$)alkylamine (or a suitable diamine) itself. In general, such reactions are carried out at sub-ambient, ambient or super-ambient temperature conditions, which can range from about 20° C. to about 50° C. The time required to complete the reaction may depend upon the type of pendent group that is being formed. For example, when X is bromine, it may react faster with the amine to form the corresponding ammonium bromide, and when X is chlorine it may take longer reaction time as is appreciated by one of skilled in the pertinent art. Generally, the reaction time is from several hours to 2 days to 5 days or longer.

The quaternized anion exchange membrane thus formed is then thoroughly washed with water to remove any residual halide ion present in the AEM. Deionized water can be used for this purpose. Finally, the AEM is soaked with an alkali solution to fully exchange all of halide ion pendent groups in the support for hydroxide ions. This is generally carried out at ambient temperature, however, sub-ambient as well as super-ambient conditions may be used as is required for the fabrication of the intended membrane support. Generally, the soaking is carried out at room temperature (around 25° C. and for 8 hours to 24 hours or longer.

Accordingly, there is provided an anion exchange membrane comprising the composition of this invention, wherein said composition is first mass polymerized either by heating the composition from about 80° C. to 120° C. or exposing to suitable actinic radiation and then treating with tri($C_1$-$C_4$)alkyl amine to form a quaternized anion exchange membrane.

In another aspect of this invention there is also provided an anion exchange membrane produced in accordance with the method of this invention.

Surprisingly, by employing suitable amount of at least one monomer of formula (I) and at least one monomer of formula (III) it is now possible to prepare membrane support containing a polymer coating containing the composition of this invention which exhibits properties thus far not achieved by any of prior art AEMs. First, the composition of this invention provides a polymer coating which is more stable than the membranes reported in the literature. For example, the AEMs formed in accordance with this invention is more stable than the AEMs made by norbornene based block copolymers as disclosed in PCT Publication No. WO2019/191225 A1 or the AEMs made by norbornene based block copolymers as disclosed in PCT Publication No. WO2022/026794 A1. Second, by employing a small amount of at least one monomer of formula (III) in the composition of this invention it is now possible to form crosslinked structure, which is advantageous to control the swelling of the membrane support. That is to say that the swelling of the membrane can be simply tailored by employing as little as 0.5 mole percent to 3.0 mole percent of the monomer of formula (III). As it is apparent from the discussions that follow and the working examples provided below controlling the swelling rate is one of the of the critical factors in the performance of the membrane especially as an AEM. Third, the compositions of this invention can be used to coat a variety of three-dimensional objects such as in the form of a tubular composite, hollow fiber, a dense film flat sheet, or a thin film composite, which are commonly used as membrane materials.

As is apparent from the specific examples that follow, it should again be noted that judicious amount of monomer of formula (III) imparts to the AEM produced therefrom hitherto unattainable properties. For instance, attempts to make membranes without any monomer of formula (III) results in membranes which are too delicate (i.e., fragile) and cannot be used as anion exchange membranes. Even more importantly, the ion exchange capacity (IEC) of membranes formed without the monomer of formula (III) are generally low and it may even be lower than 3 meq/g. Surprisingly, now it has been found that the membranes made in accordance of this invention are capable of IEC of at least 3 meq/g and generally it ranges from about 3 meq/g to 3.5 meq/g or higher. In some embodiments the membranes made in accordance of this invention are capable of IEC of up to 4 meq/g or higher. In addition, it has further been found that the membranes made in accordance of this invention exhibit very high hydroxide conductivity of more than 210 mS/cm at 80° C. In some embodiments the membranes made in accordance of this invention exhibit hydroxide conductivity in the range of from about 100 mS/cm to about 190 mS/cm at 80° C. Accordingly, in some embodiments the membranes of this invention is capable of IEC of at least 3 meq/g for at least 2000 hours at a temperature from about 20° C. to about 100° C. in an aqueous alkaline medium.

Another advantageous property of the membranes of this invention is that they exhibit very high chemical stability, especially in an alkaline medium. Accordingly, in some embodiments the membranes of this invention are stable for at least 1000 hours at a temperature from about 20° C. to about 100° C. in an aqueous alkaline medium. In some other embodiments the membranes of this invention are stable for 2000 hours at a temperature of about 80° C. in an aqueous alkaline medium.

It is further noted that by incorporating suitable amounts of monomer of formula (III) it is now possible to introduce sufficient crosslinks in the polymeric backbone. It should further be noted that not all crosslinks occur inter-molecular (i.e., between two different polymer chains). Some crosslinks can occur intra-molecular (i.e., between two crosslinkable sites on the same polymer chain). Statistically, this can happen and all such combinations are part of this invention. That is to say that when the composition of this invention is mass polymerized, the monomer of formula (III) is crosslinked either intramolecularly or intermolecularly.

In yet some other embodiments the mass polymerized polymer formed from the composition of this invention exhibits ion conductivity from about 160 mS/cm to about 280 mS/cm at a temperature from about 30° C. to about 100° C.

The mass polymerized polymers formed from the composition of this invention are expected to exhibit very high glass transition temperatures ($T_g$), which can range from 250° C. to 400° C. Although the mass polymerized polymers formed from the composition of this invention containing flexible alkyl side chain may lower the $T_g$, it is possible to tailor the copolymers by appropriate selection of the monomers as described herein so as to exhibit $T_g$'s higher than 300° C. Thus, offering additional thermal property benefit for the membranes made in accordance of this invention. It should be noted that quaternary ammonium pendent-groups are known to break-down at or below 250° C., surprisingly that is not the case with the membranes of this invention containing such quaternary ammonium pendent-groups.

As noted, it has been a long sought need to find AEMs featuring long alkaline stability with high conductivity to achieve low ohmic resistance losses. Hydroxide conductivity is a function of ion mobility and ion exchange capacity (IEC). The IEC of the AEM is often kept to a modest value in an effort to avoid high water uptake which can result in swelling of the membrane and low ion mobility. The mobility can be improved by the formation of efficient ion conducting channels (maybe by the use of monomer of formula (III) as described above) and preventing excess water uptake within the membrane. Thus, membranes face the conundrum of striving to achieve high IEC but suffering the consequences that come from the water that the ions attract. Cross-linking can be used to address excess water uptake but often at the expense of low ion mobility. However, this effect is achieved by employing suitable combination of monomers of formulae (I) and (III) in combination with a monomer of formula (II) as described hereinabove.

Further, AEM fuel cells operate at high pH using two electrodes: a negative electrode (also known as the anode) where hydrogen is oxidized and a positive electrode (also known as the cathode) where oxygen is reduced, as shown below.

Positive electrode: $2H_2O+O_2+4e^-\rightarrow 4OH^-$

Negative electrode: $4OH^-+2H_2\rightarrow 4H_2O+4e^-$

Net reaction: $O_2+2H_2\rightarrow 2H_2O$ (plus energy produced)

In the fuel cell, oxygen or air is fed to the oxygen reduction reaction (ORR) positive electrode, and hydrogen gas is fed to the hydrogen oxidation reaction (HOR) negative electrode. Electrons pass through the external circuit to perform useful electrical work. It is known that these reactions are sensitive to the relative humidity of the fuel and oxidant streams, as well as the water uptake in the AEM and ionomer. Proper water management in the membrane and electrodes is critical to achieve high power density. Some of the water electrochemically generated at the HOR electrode is consumed at the cathode by the ORR in an AEM fuel cell. Water is transported from the cathode to the anode by electro-osmotic drag accompanying anion transport. Water also back diffuses from the anode to cathode. Without adequate water content within the membrane and electrodes, ionic conductivity suffers and polymer degradation accelerates due to the higher reactivity of hydroxide at lower water concentration. On the other hand, if there is too much water, catalyst layers can be easily flooded, and the efficient flow of ions within the electrodes and membranes can be disrupted. Mechanical degradation in the membrane can also occur due to the higher internal stress and expansion within the AEM.

Water electrolysis producing hydrogen gas and oxygen gas is the reverse reaction from the fuel cell, as shown below.

Positive electrode: $4OH^-\rightarrow H_2O+O_2+4e^-$

Negative electrode: $4H_2O+4e^-\rightarrow 4OH^-+2H_2$

Net reaction: $2H_2O\rightarrow O_2+2H_2$ (energy is added)

In this case, liquid water can be fed to the positive electrode where the oxygen evolution reaction takes place (OER) and hydrogen gas is produced at the negative electrode (HER). It is most desirable to restrict the flow of hydrogen produced at the HER so its pressure is high. This avoids having to pressurize the hydrogen in a subsequent process. Thus, the membrane has to withstand significant differential pressure.

Similar electrochemical reactions can be used to separate specific species from in gas or liquid feed stream. The ORR and OER reactions can be used to make an oxygen pump.

Positive electrode: $4OH^-\rightarrow 2H_2O+O_2+4e^-$

Negative electrode: $2H_2O+O_2+4e^-\rightarrow 4OH^-$

Net reaction: $O_2$ from negative electrode is moved to $O_2$ at positive electrode side.

Similar reactions can be used to separate carbon dioxide from an incoming gas stream by allowing the hydroxide ions to react with carbon dioxide producing carbonate.

Negative electrode: $2H_2O_2+4e^-\rightarrow 4OH^-+ 2CO_2\rightarrow 2CO_3^{2-}+2H_2O$ Positive electrode: $2CO_3^{2-}\rightarrow 2CO_2+O_2+4e^-$ Net reaction: $CO_2$ from negative electrode is moved to $CO_2$ at positive electrode side.

In a similar way, hydrogen can be pumped from one gas stream to another by using the HER and HOR.

Positive electrode: $4OH^-+2H_2\rightarrow 4H_2O+4e^-$

Negative electrode: $4H_2O+4e^-\ 4OH^-+2H_2$

Net reaction: $H_2$ from positive electrode is moved to $H_2$ at negative electrode side.

In each of these reactions, anions are transported between the two electrodes. Efficient ion channels are needed in the AEM to achieve high conductivity because the number of ions cannot be independently increased (i.e., higher ion exchange capacity (IEC)) because of the penalty due to excessive water uptake. Surprisingly, it has now been found that high mobility ion channels can be formed by employing proper combination of the composition of this invention in conjunction with proper fabrication of the membrane as described herein. The membranes formed according to this invention not only feature high IEC but also retain such property even after long operational conditions, which can be as high as several months to one year or longer.

The nature of the polymer backbone and type/location of hydrophilic groups within the polymer is also important for long term AEM stability at high pH. It has been experimentally shown that polar moieties, such as ether, ketone or ester linkages, within the polymer or side-groups, are susceptible to nucleophilic attack and backbone degradation. Positioning the cation pendent groups at the ends of pendant alkyl tether has also been found to be an effective strategy for mitigating polymer degradation. Quaternary ammonium pendent groups, especially the trimethyl ammonium cation, has been found to have an excellent balance of conductivity and stability, although other conducting groups show merit as well.

In addition to the membrane itself, ion conducting polymers are needed to form the electrodes. Electrodes are made in three-dimensional structures so that they have a very high surface area. In a typical process, the electroactive catalyst is mixed with some of the anion conducting polymer (alternatively composition of this invention containing proper combination of monomers which when mass polymerized forms anion conducting polymer) to form an ink. The ink is then sprayed onto a gas diffusion layer (GDL) which also serves as the current collector. Two electrodes, which may be identical in composition or have different catalyst are then pressed onto the solid polymer membrane to make a membrane electrode assembly (MEA). The MEA is placed between solid blocks which help distribute the gases or liquids needed in the reaction.

One of the remaining challenges in the design of stable, high conductivity AEMs is water uptake. Excessive water uptake can occur at high IEC causing channel flooding and membrane swelling. This leads to mechanical distortion and softening of the membranes. Materials with high IEC tend to adsorb large quantities of water. Some water is needed to form the ion solvent-shell as well as dilution of the hydroxide salt within the membrane. The absorbed water must be adequate for ion solvation, however, excess free-water is not productive or desired. Thus, the water content can be divided into bound water (for forming the solvent shell) and free water. Hence, it is necessary to choose an IEC which balances the amount of free and bound water inside the membranes to yield maximum ion mobility (i.e., conductivity) while maintaining AEM mechanical properties.

For example, Chen et al., RSC Adv. 2015, 5, 63215-63225 reported that an AEM formed from a vinyl addition poly (norbornene) produced a very low conductivity (4 mS/cm at 80° C.) and showed a modest decline in conductivity after soaking in 6 M NaOH at room temperature. This AEM also exhibited low ion exchange capacity. It should further be noted that this polymer was not a block polymer and the pendent group tethers contained ether linkages which are known to be susceptible to hydroxide attack.

Another challenge faced by the art is prolonged use of the membrane in a liquid medium, such as for example, aqueous medium results in swelling of the membrane as discussed in length above. Surprisingly, it has now been found that controlled level of surface crosslinking results in mitigating undesirable swelling of the membrane and retain ion conductivity for an extended period of time. Accordingly, in some embodiments of this invention the membrane fabricated in accordance of this invention is subjected first to a suitable diamine for a sufficient length of time prior to quaternization. Any of the diamines that would bring about this surface crosslinking can be used for this purpose. Non-limited examples of such diamines include for example, ethylene diamine, N,N'-dimethyl-1,2-ethanediamine, N,N'-dimethyl-1,3-propanediamine, N,N'-dimethyl-1,4-butanediamine, N,N'-dimethyl-1,5-pentanediamine, N,N'-dimethyl-1,6-hexane-diamine, and the like. Any of the other known diamines which would react similarly can also be used for this purpose. Generally, such surface crosslinking can be carried out by simply soaking or dipping the membrane in any one of the aforementioned diamines. Such dipping can include an additional solvent such as for example, alcohol such as isopropanol. For example, the membrane is soaked in a 50/50 weight percent mixture of isopropanol and N,N'-dimethyl-1,6-hexanediamine for a sufficient length of time. Any of the desirable time can be used for this purpose, which may range from about 1 minute to four hours or longer. However, it has now been observed that soaking the membrane for a longer than one day may not provide the beneficial effect. Accordingly, in some embodiments the membrane is soaked in a suitable diamine solution for a period of about 10 minutes to three hours, 30 minutes to 150 minutes, one hour to two hours, and so on.

Advantageously, it has now been observed that by forming sufficient level of surface crosslinking of the membrane it is now possible to control the degree of swelling of the membrane. Accordingly, in some embodiments sufficient amount of surface crosslinking results in reduction of swelling of the membrane up to forty percent. In some other embodiments sufficient amount of surface crosslinking results in reduction of swelling of the membrane up to thirty percent, twenty percent or ten percent. It should further be noted that the ion conductivity of the membrane is substantially retained even with such surface crosslinking. For example, the ion conductivity of the membrane is retained up to eighty percent of its original capacity even with surface crosslinking while less swelling observed for several days, which could range from one week to ten weeks to fifteen weeks or longer.

Accordingly, the membranes of this invention are useful in a variety of applications including electrochemical device, and the like. Accordingly, in one aspect of this invention there is provided an electrochemical device comprising the membrane of this invention. In another embodiment there is further provided a fuel cell comprising the membrane of this invention.

This invention is further illustrated by the following examples which are provided for illustration purposes and in no way limit the scope of the present invention.

EXAMPLES (GENERAL)

The following abbreviations have been used hereinbefore and hereafter in describing some of the compounds, instruments and/or methods employed to illustrate certain of the embodiments of this invention:

BuNB—5-butylbicyclo[2.2.1]hept-2-ene; NBBuBr-5-(4-bromobutyl)bicyclo[2.2.1]hept-2-ene: NBBuNB-1,4-di (bicyclo[2.2.1]hept-5-en-2-yl)butane;
NBOctylNB-1,8-di(bicyclo[2.2.1]hept-5-en-2-yl)octane;
Pd601-n-butyldi-1-adamantylphosphine palladium diacetate($H_2O$);

Pd785—palladium diacetate bis(tricyclohexylphosphine);
Pd1206-(acetonitrile)bis(triisopropylphosphine)palladium(acetate)tetrakis-(penta-fluoro-phenyl) borate;
LiFABA—lithium tetrakis(pentafluorophenyl)-borate· (2.5Et$_2$O);
DANFABA—dimethylanilinium tetrakis(pentafluorophenyl)borate;
Bluesil PI 2074—tolylcumyliodonium-tetrakis pentafluorophenylborate, commercially available under the tradename;
THF—tetrahydrofuran; EtOAc—ethyl acetate; MeOH—methanol; IPA—isopropyl alcohol; PET films—polyethylene terephthalate films; PTFE—polytetrafluoroethylene;
phr—parts per hundred parts of monomers; HPLC—high performance liquid chromatography; DI water—deionized water.

Examples 1-9

AEM Films Formed by Mass Polymerization of the Composition of this Invention

A variety of films were formed from various compositions of this invention in these Examples 1 to 9 as follows. In separate glass brown bottles, LiFABA (3 molar parts) and Pd601 (1 molar part) were dissolved in EtOAc (2.5 phr) to form a clear solution. Similarly, various mixtures of three monomers, BuNB, NBBuNB, and NBBuBr (10,000 total molar parts) were prepared as summarized in Table 1. In each of Examples 1 to 9, the monomer mixture was then added to the catalyst solution. Then, each of the compositions of Examples 1 to 9 was filtered through a 0.45 μm PTFE syringe filter, doctor bladed on a glass sheet and placed on a preheated hot plate at 100° C. for 10 min to cure to form films. The films were colorless, flexible, and free-standing having a thickness in the range of from about 25 μm to 40 μm. Each of the films so formed were vacuum dried at 100° C. for 1 hour.

The films were quaternized by immersion in 50 wt % aqueous trimethylamine solution for 3 days at room temperature. The quaternized films with bromide counter-ion were washed thoroughly with DI water. The films were then soaked in 1 M NaOH solution for 24 h to exchange the bromide ions for hydroxide ions. The ionic resistance of the films was measured using a fourpoint, in-plane probe and Hewlett Packard Precision LCR Meter (20 Hz to 1 MHz). All samples were tested in HPLC-grade water under nitrogen. The in-plane ionic conductivity was calculated using the equation:

$$\sigma = L/(WTR)$$

Where, σ is ionic conductivity, L is length between sensing electrodes, W and T are the width and thickness of the film, respectively, and R is the resistance measured.

FIG. 1 shows the ionic conductivity of the mass polymerized and quaternized films obtained from each of compositions from Examples 1 to 9 in DI water at various temperatures. These results suggest that even at small amounts (0.5 mole %) of monomer of formula (III) and using reasonably higher amounts of monomer of formula (I) the conductivity of the films can be generally increased. That is, the films formed from the compositions of Examples 4 and 9, both contain only 0.5 mole percent of monomer of formula (III) and 97 mole percent of monomer of formula (I), exhibit higher conductivities at all measured temperatures, whereas the film formed from the composition of Example 5, which contained 3 mole percent of monomer of formula (III) and 77.5 mole percent of monomer of formula (I) exhibits lower conductivity at all measured temperatures.

TABLE 1

| Example No. | Monomer molar ratio | | |
|---|---|---|---|
| | BuNB | NBBuNB | NBBuBr |
| Example 1 | 12 | 0.5 | 87.5 |
| Example 2 | 22 | 3 | 75 |
| Example 3 | 3 | 3 | 94 |
| Example 4 | 2.5 | 0.5 | 97 |
| Example 5 | 19.5 | 3 | 77.5 |
| Example 6 | 24 | 1 | 75 |
| Example 7 | 24.5 | 0.5 | 75 |
| Example 8 | 12.5 | 1 | 86.5 |
| Example 9 | 2 | 1 | 97 |

Example 10

Shelf Life Stability of the Composition of this Invention

The composition of Example 6 was used in this shelf life stability study. A portion of the composition from Example 6 was kept at 23° C. to monitor the viscosity change over two days. The viscosity of the composition was measured at designated time intervals as summarized in Table 2. No significant viscosity change occurred in the initial measurement period of two hours. The viscosity gradually increased over a period of two days of storage. However, the reactivity of the composition remained relatively same over this test period indicating that the compositions of this invention can be stored for one to two days without adversely sacrificing their reactivity.

TABLE 2

| Time | Viscosity, cP |
|---|---|
| 0 hours | 8 |
| 2 hours | 8 |
| 1 day | 80 |
| 2 days | 190 |

Examples 11-14

Fabrication of AEM

Supported AEMs were fabricated by dip-coating porous membrane supports, the characteristics of the supports used in these Examples are summarized in Table 3. In each of Examples 11 to 14, the respective porous membrane supports were dip coated using the composition of Example 6. The dip coated supports are then placed between two sheets of PET films. The excess liquid was squeezed out and the film stack was placed in the oven at 100° C. for 1 hour to cure. The PET films were then pulled off and the composite membranes thus formed were vacuum dried at 100° C. for 1 hour. FIGS. 2A and 2B respectively show the photographs of the support material from Example 12 before coating and cure and after coating and cure. FIG. 3 shows SEM cross-section of the membrane obtained in Example 12 after cure.

The SEM was taken using Tescan LYRA-3 Model XMU FIB-FESEM. The thickness of the membrane did not change after cure, however, the weight of the membrane was increased proportionally to the open volume in the support material. This fabrication technique allows the formation of a continuous polymer phase inside the support material, providing optimum ionic transfer in through-plane configuration.

TABLE 3

| Example No. | Material | Thickness, μm | Porosity, % |
|---|---|---|---|
| Example 11 | polypropylene microporous monolayer membrane (Z3030) | 18 | 70 |
| Example 12 | polypropylene microporous monolayer membrane (PP2075) | 20 | 48 |
| Example 13 | PTFE (Sterlitech JHWP09025) | 30 | — |
| Example 14 | PTFE (Omnipore 1121844) | 40 | 80 |

The composite membranes thus formed in Examples 11 to 14 were quaternized substantially following the procedures set forth in Examples 1 to 9 to obtain various AEMs formed in accordance of this invention. The AEMs thus formed were then tested for their ion conductivity at various temperatures substantially following the procedure as described in Examples 1 to 9. The results are summarized in Table 4. For comparison, the ion conductivity measured for the film obtained in Example 6 is included in Table 4. It is evident from the data presented in Table 4, the ion conductivity of the AEMs made in accordance with this invention can be substantially similar to the films made in accordance with this invention as set forth in Examples 1 to 9. In particular, FIG. 1 graphically shows the ionic conductivities at various temperatures of various films made from the compositions of Examples 1 to 9.

TABLE 4

| Example No. | Substrate | 25° C. | 40° C. | 60° C. | 80° C. |
|---|---|---|---|---|---|
| Example 6 | none | 103 | 132 | 171 | 207 |
| Example 11 | Z3030 | 70 | 99 | 134 | 168 |
| Example 12 | PP2075 | 38 | 49 | 69 | 88 |
| Example 13 | Sterlitech JHWP09025 | 80 | 106 | 139 | 175 |
| Example 14 | Omnipore 1121844 | 79 | 107 | 138 | 172 |

The ion transfer in an electrolyzer takes place across the membrane, i.e., in-plane conductivity. In this case, measuring through-plane conductivity is the preferable way for membrane characterization. However, it requires a different experimental configuration for in-plane conductivity measurement. Based on the architecture of the AEM composites of Examples 11 to 14 through-plane and in-plane conductivity are expected to be the same due to the homogeneity of the continuous polymer phase in all directions.

Example 15

The procedures of Examples 1 to 9 were substantially repeated in this Example 15 except for using only NBBuBr and NBOctylNB (99:1 molar ratio) to form the composition in accordance with this invention.

Then the procedures of Example 11 were substantially followed to form an AEM supported on a polypropylene microporous monolayer membrane material (Z3030). The ion conductivity of the so formed supported AEM was measured at various temperatures and the results are summarized in Table 5. It is evident from the data presented in Table 5, the AEM formed in accordance with this invention exhibits excellent ion conductivity.

TABLE 5

| Temperature, ° C. | Ion Conductivity, mS/cm |
|---|---|
| 25 | 99 |
| 40 | 130 |
| 60 | 172 |
| 80 | 214 |

Example 16

UV Initiated Mass Polymerization to Form AEM

In a glass bottle, Pd785 (1 molar part), Bluesil PI 2074 (2 molar parts) and ITX (2 molar parts) were dissolved in the mixture of monomers from Example 6 (BuNB/NBBuNB/NBBuBr 24/1/75 molar ratio, 10,000 molar parts) to form a clear solution. The membrane fabrication was performed substantially following the procedures of Example 11 except for using the composition as formed above and carrying out the coating and lamination in an inert atmosphere of nitrogen. The polypropylene microporous monolayer membrane support (Z3030) used in Example 11 was also used in this Example 16. The excess liquid was squeezed out and the film stack was first irradiated with UV light (395 nm, 500 mW/cm$^2$ for 4 sec) and then kept in an oven at 100° C. for one hour. The PET films were then pulled off and the composite membrane thus formed was vacuum dried at 100° C. for one hour. The cured membrane support was quaternized by contacting it with trimethylamine to form the AEM composite membrane. The ion conductivity of the AEM thus formed was measured following the procedures as described in Examples 1 to 9. The results are summarized in Table 6.

No change in viscosity and reactivity of the composition was observed after 10-day storage at room temperature. Therefore, the composition of Example 16 also features good shelf life stability.

TABLE 6

| Temperature, ° C. | Ion Conductivity, mS/cm |
|---|---|
| 25 | 83 |
| 40 | 111 |
| 60 | 150 |
| 80 | 185 |

Example 17

The procedures of Example 16 were substantially repeated in this Example 17 except that coating and lamination were carried out in air. The ion conductivity of the resulting AEM was measured at various temperatures and the results are summarized in Table 7. It is interesting to note that the fabrication of the AEM under air in fact seems to improve the conductivity of the resulting AEM.

TABLE 7

| Temperature, ° C. | Ion Conductivity, mS/cm |
|---|---|
| 25 | 145 |
| 40 | 185 |
| 60 | 235 |
| 80 | 285 |

Example 18

UV Initiated Mass Polymerization to Form Thicker AEM

Figure 4:
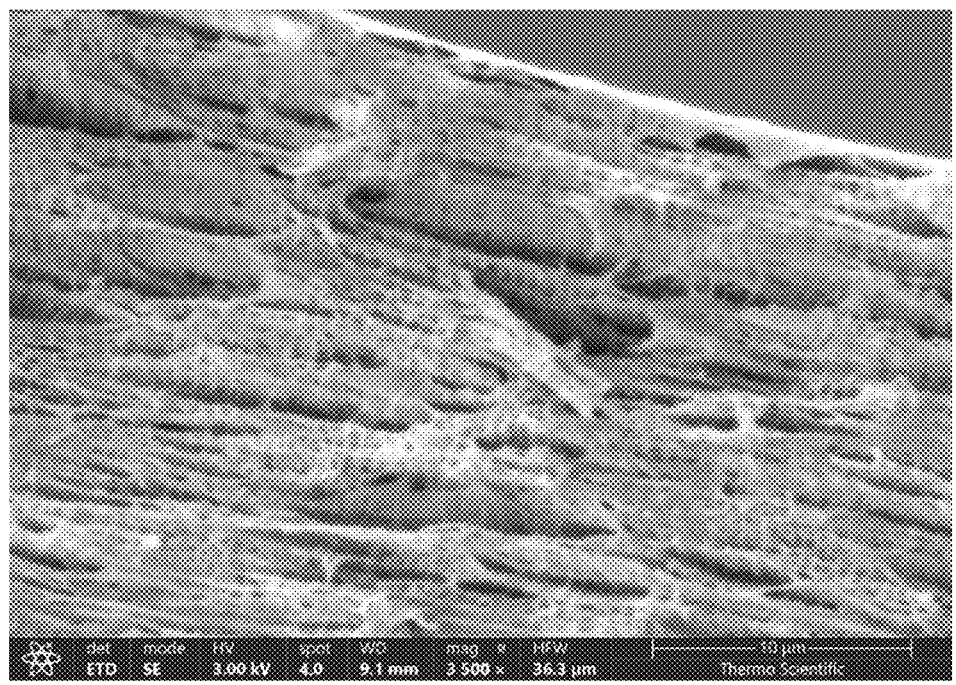
FIG. 4 shows the scanning electron micrograph (SEM) cross-section of original Z3030 support.
Figure 5:
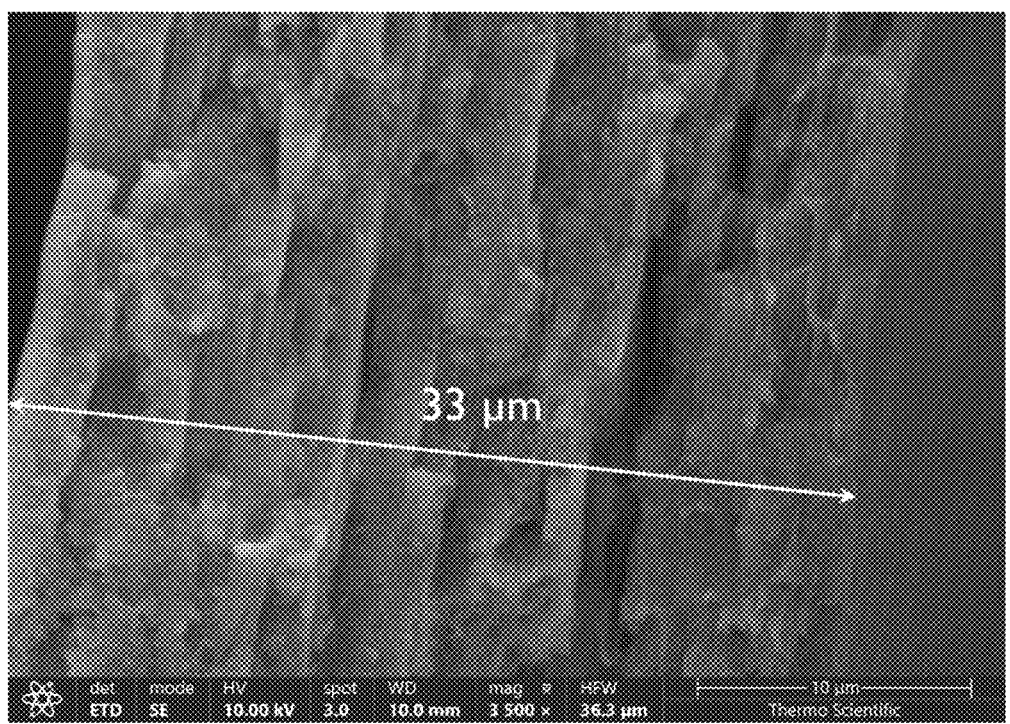
FIG. 5 shows the scanning electron micrograph (SEM) cross-section of another AEM surface made in accordance of this invention.

The procedures of Example 17 were substantially repeated in this Example 18 except for employing a double layer of Z3030 support and a monomer mixture of NBBuBr and NBOctylNB (99:1 molar ratio). The ion conductivity of the resulting AEM was measured at various temperatures and the results are summarized in Table 8. FIG. 4 shows SEM cross-section of the original Z3030 support as employed before coating of the monomer mixture, where micro-porous structure is clearly visible. FIG. 5 shows SEM cross-section of the membrane obtained in Example 18 after coating and curing with the monomer mixture. The micropores are filled with the polymer formed by the mass polymerization of the monomeric mixture and there is no gap between two support layers indicating formation of the continuous norbornene polymer phase through the whole thickness of the membrane.

TABLE 8

| Temperature, ° C. | Ion Conductivity, mS/cm |
|---|---|
| 25 | 143 |
| 40 | 178 |
| 60 | 235 |
| 80 | 290 |

Examples 19-20

UV Initiated Mass Polymerized AEM with Higher Level of Crosslinking

The procedures of Example 18 were substantially repeated in these Examples 19 and 20 except for employing a monomer mixture of NBBuBr and NBOctylNB (98:2 and 97:3 molar ratio respectively). The ion conductivity of the resulting AEMs was measured at various temperatures and the results are summarized in Table 9.

TABLE 9

| Example No. | NBBuBr:NBOctylNB | 25° C. | 40° C. | 60° C. | 80° C. |
|---|---|---|---|---|---|
| Example 19 | 98:2 | 114 | 146 | 195 | 240 |
| Example 20 | 97:3 | 96 | 121 | 162 | 201 |

Examples 21-22

AEM with Controlled Surface Crosslinking

The procedures of Example 11 were substantially repeated in these Examples 21-24 except for employing a double layer of Z3030 support and only NBBuBr as the olefinic monomer. Prior to quaternization the membrane was kept in diamine, N,N'-dimethyl-1,6-hexanediamine/isopropanol 50/50 wt % solution, for either 0 hours (Example 21) or three hours (Example 22), as also summarized in Table 10 and then washed with isopropanol. The ion conductivity of the resulting AEM was measured at various temperatures and the results are summarized in Table 10. Although the membrane formed in Example 22 exhibited lower conductivity across the temperature range measured as summarized in Table 10, the membrane of Example 22 also exhibited less swelling of about 22 percent in both and x and y dimension when compared with the membrane of Example 21. Thus this study demonstrates that the swelling of the membrane can be controlled and/or reduced by appropriate level of surface crosslinking thereby prolonging the life of the membrane. Also, it is evident that surface crosslinking substantially decreases the thickness of the anion-resistive layer (i.e., formation of dense network) thereby improving overall conductivity compared to bulk crosslinking. It should further be noted that soaking the membrane in diamine longer than three hours results in significant loss of conductivity as evidenced by the Comparative Examples 3 and 4, where substantial loss of conductivity was observed by soaking the membrane in diamine longer than a day.

TABLE 10

| Example No. | Time in diamine solution | 25° C. | 40° C. | 60° C. | 80° C. |
|---|---|---|---|---|---|
| Example 21 | 0 hours | 140 | 180 | 239 | 300 |
| Example 22 | 3 hours | 92 | 118 | 160 | 205 |
| Comp. Ex. 3 | 1 day | 14 | 20 | 29 | 39 |
| Comp. Ex. 4 | 1 week | 7 | 8 | 9 | 10 |

Comparative Examples 1-2

In these Comparative Examples 1 and 2 commercial AEM Pention-AEM-72_05 (https://www.fuelcellstore.com/xergy-xion-composite-pention-aem-72-05-5cl-72600070#:~:text=The%20Xergy%20Pention%2DAEM%2D72, a%20wide%20variety%20of%20chemistries.) with thicknesses of 25 and 46 μm were used, respectively. As described in the vendor's website (the URL provided above), the Pention-AEM membranes are formed from a poly(norbornene) based resin. The in-plane conductivity of these membranes were measured and summarized in Table 11. It is evident from the results presented in Table 11, the commercially available membranes feature much inferior ion conductivity properties under comparable conditions while comparing with the AEMs produced in accordance with this invention.

TABLE 11

| Example No. | Pention-AEM-72_05 | 25° C. | 40° C. | 60° C. | 80° C. |
|---|---|---|---|---|---|
| Comp. Ex. 1 | 25 μm thickness | 41 | 58 | 83 | 110 |
| Comp. Ex. 2 | 46 μm thickness | 55 | 75 | 106 | 140 |

Figure 6:
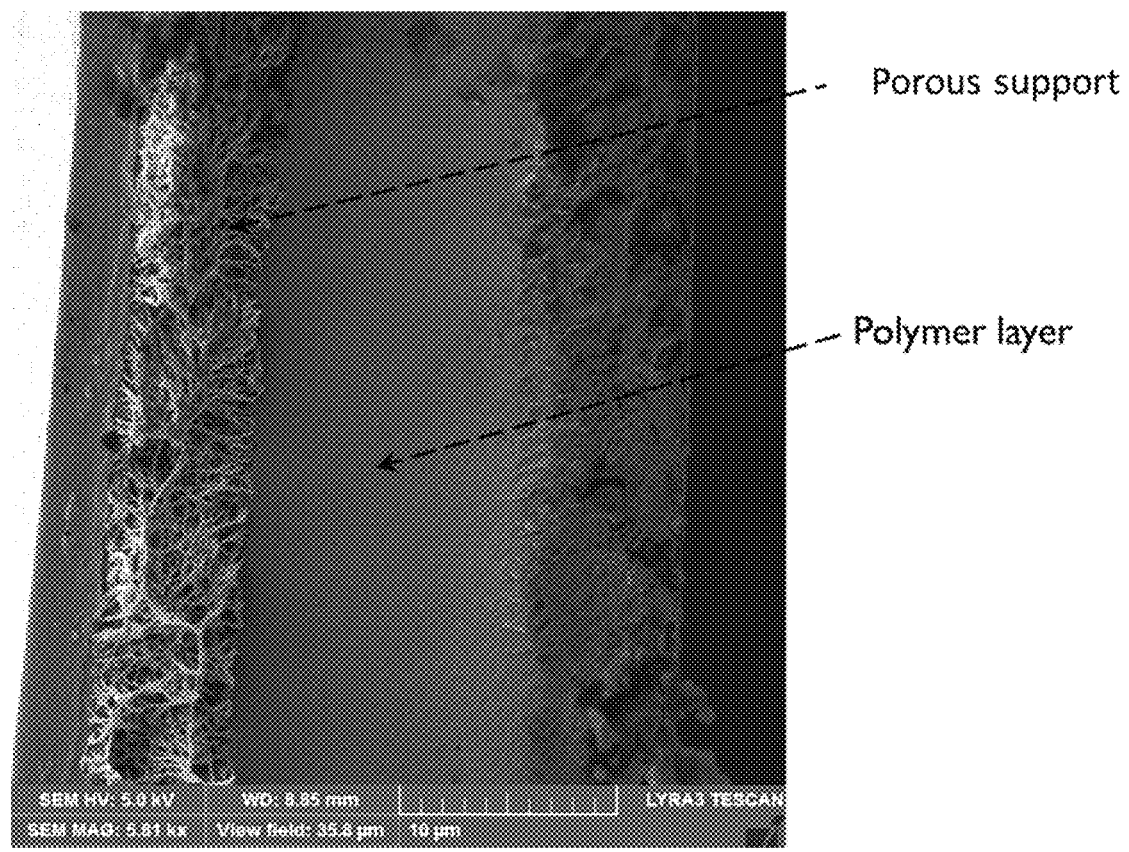
FIG. 6 shows the scanning electron micrograph (SEM) cross-section of a commercially available Pention AEM.

FIG. 6 shows a cross-sectional SEM view of 25 μm Pention_AEM used in Comparative Example 1, which reveals a very open structure of the support layer. This open structure indicates that the continuous polymer phase is only a small fraction of the total structure. Perhaps this may be a limiting factor in ionic conductivity across those type of membrane channels (i.e., through-plane conductivity) resulting in significantly lower performance in the electrolyzer cell.

Comparative Examples 3-4

The procedures of Example 21 were substantially repeated in these Comparative Examples 3-4 except for keeping the membrane in diamine, N,N'-dimethyl-1,6-hexanediamine/isopropanol 50/50 wt % solution, for one day (Comparative Example 3) or one week (Comparative Example 4), as also summarized in Table 10 prior to quaternization and then washed with isopropanol.

Although the invention has been illustrated by certain of the preceding examples, it is not to be construed as being limited thereby; but rather, the invention encompasses the generic area as hereinbefore disclosed. Various modifications and embodiments can be made without departing from the spirit and scope thereof.

What is claimed is:

1. A membrane forming composition comprising:
a) one or more monomers of formula (I):

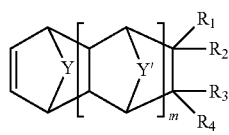
(I)

wherein:
Y and Y' are the same or different and independently of each other selected from the group consisting of —CH$_2$—, —CH$_2$—CH$_2$— and —O—;
m is an integer from 0 to 3;
at least one of $R_1$, $R_2$, $R_3$ or $R_4$ is a group of the formula R—X,
where R is selected from the group consisting of ($C_1$-$C_{10}$)alkylene, ($C_3$-$C_8$)cycloalkylene, ($C_1$-$C_{10}$)alkylene($C_3$-$C_8$)cycloalkylene, ($C_1$-$C_{10}$)alkylene($C_3$-$C_8$)cycloalkylene ($C_1$-$C_{10}$)alkylene, ($C_1$-$C_{10}$)alkylene($C_6$-$C_{10}$)arylene and ($C_1$-$C_{10}$)alkylene($C_6$-$C_{10}$)arylene($C_1$-$C_{10}$)alkylene;
X is selected from the group consisting of halogen, hydroxy, ($C_1$-$C_{10}$)alkoxy and ($C_6$-$C_{12}$)aryloxy; and
the remaining $R_1$, $R_2$, $R_3$ and $R_4$ are independently of each other selected from the group consisting of hydrogen, methyl, ethyl, linear or branched ($C_3$-$C_{10}$)alkyl, ($C_3$-$C_8$)cycloalkyl, ($C_1$-$C_{10}$)alkyl($C_3$-$C_8$)cycloalkyl and ($C_1$-$C_{10}$)alkyl($C_6$-$C_{10}$)aryl;
b) one or more monomer of formula (III):

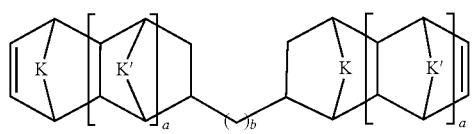
(III)

wherein:
a is an integer 0, 1 or 2;
b is an integer from 1 to 10; and
K and K' are the same or different and independently of each other selected from the group consisting of —CH$_2$—, —CH$_2$—CH$_2$—, —O— and —S—; and c) a thermally active palladium catalyst comprising:
i) a compound of formula (IV):

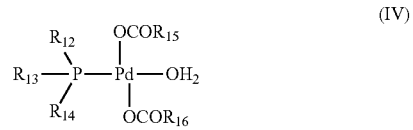
(IV)

wherein:
at least two of $R_{12}$, $R_{13}$ and $R_{14}$ are the same and is selected from the group consisting of tert-($C_4$-$C_{12}$)alkyl, 1-($C_1$-$C_5$)alkyl($C_3$-$C_8$)cycloalkyl, 1-($C_8$-$C_{12}$)bicycloalkyl and 1-($C_8$-$C_{12}$)tricycloalkyl, ($C_6$-$C_{10}$)aryl and ($C_6$-$C_{10}$)aryl($C_1$-$C_3$)alkyl;
and the remaining $R_{12}$, $R_{13}$ or $R_{14}$ is methyl, ethyl, linear or branched ($C_3$-$C_{12}$)alkyl, ($C_6$-$C_{10}$)aryl and ($C_6$-$C_{10}$)aryl($C_1$-$C_3$)alkyl; and
$R_{15}$ and $R_{16}$ are the same or different and each independently selected from the group consisting of methyl, ethyl, linear or branched ($C_3$-$C_{20}$)alkyl, trifluoromethyl, pentafluoroethyl, linear or branched ($C_3$-$C_{20}$)perfluoroalkyl; and
ii) a compound of formula (VI):

(VI)

wherein
$M_d^\oplus$ is a cation selected from lithium, sodium, potassium, cesium, barium, ammonium and linear or branched tetra($C_1$-$C_4$)alkyl ammonium;
$Z^\ominus$ is a weakly coordinating anion selected from the group consisting of $B(C_6F_5)_4^\ominus$, $B[C_6H_3(CF_3)_2]_4^\ominus$, $B(C_6H_5)_4^\ominus$, $[Al(OC(CF_3)_2C_6F_5)_4]^\ominus$, $BF_4^\ominus$, $PF_6^\ominus$, $AsF_6^\ominus$, $SbF_6^\ominus$, $(CF_3SO_2)_2N^\ominus$, $(CF_3SO_2)_3C^\ominus$ and $CF_3SO_3^\ominus$;
and wherein the amount of monomer of formula (III) present is no more than 3 mole percent based on the total combined moles of monomer of formula (I) and monomer of formula (III).

2. The composition according to claim 1 further comprising one or more monomers of formula (II):

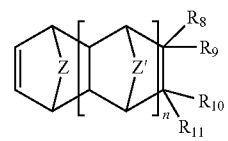
(II)

wherein:
Z and Z' are the same or different and independently of each other selected from the group consisting of —CH$_2$—, —CH$_2$—CH$_2$— and —O—;
n is an integer from 0 to 3; and
$R_8$, $R_9$, $R_{10}$ and $R_{11}$ are the same or different and independently of each other selected from the group consisting of hydrogen, methyl, ethyl, linear or branched ($C_3$-$C_{10}$)alkyl, ($C_3$-$C_8$)cycloalkyl, ($C_1$-$C_{10}$)alkyl($C_3$-$C_8$)cycloalkyl and ($C_1$-$C_{10}$)alkyl($C_6$-$C_{10}$)aryl.

3. The composition according to claim 1, wherein the palladium catalyst comprising:
   a) a compound of formula (IV):
      wherein:
      at least two of $R_{12}$, $R_{13}$ and $R_{14}$ are the same and is selected from the group consisting of tert-butyl, 1-norbornyl, 1-bicyclo[2,2,2]octyl and 1-adamantyl; and the remaining $R_{12}$, $R_{13}$ or $R_{14}$ is selected from the group consisting of n-propyl, n-butyl, n-pentyl and n-hexyl; and
      $R_{15}$ and $R_{16}$ are the same or different and each independently selected from the group consisting of methyl, ethyl, n-propyl and n-butyl.

4. The composition according to claim 2, wherein
   each of m, n and a are 0 or 1;
   b is an integer from 3 to 8;
   each of Y, Y', Z, Z', K and K' is $CH_2$;
   at least one of $R_1$, $R_2$, $R_3$ and $R_4$ is a group of formula R—X, where
   R is $(CH_2)c$, $(CH_2)_c$cyclohexylene, $(CH_2)_c$cyclohexylene $(CH_2)_c$, $(CH_2)_c$phenylene, and $(CH_2)_c$phenylene $(CH_2)_c$, where c is an integer from 1 to 10;
   X is bromine;
   the remaining $R_1$, $R_2$, $R_3$ and $R_4$ are independently of each other selected from the group consisting of hydrogen, methyl, ethyl, linear or branched propyl, butyl, pentyl, hexyl, cyclopentyl, cyclohexyl, methylcyclopentyl, methylcyclohexyl and benzyl;
   $R_8$, $R_9$, $R_{10}$ and $R_{11}$ are independently of each other selected from the group consisting of methyl, ethyl, linear or branched propyl, butyl, pentyl, hexyl, cyclopentyl, cyclohexyl, methylcyclopentyl, methylcyclohexyl and benzyl;
   at least two of $R_{12}$, $R_{13}$ and $R_{14}$ are the same and is selected from the group consisting of tert-butyl, 1-norbornyl, 1-bicyclo[2,2,2]octyl and 1-adamantyl; and
   the remaining $R_{12}$, $R_{13}$ and $R_{14}$ is selected from the group consisting of n-propyl, n-butyl, n-pentyl and n-hexyl; and
   $R_{15}$ and $R_{16}$ are the same or different and each independently selected from the group consisting of methyl, ethyl, n-propyl and n-butyl.

5. The composition according to claim 1, wherein $M_d^\oplus$ is lithium; and
   $Z^\ominus$ is selected from the group consisting of $B(C_6F_5)_4^\ominus$, $B[C_6H_3(CF_3)_2]_4^\ominus$, $(CF_3SO_2)_2N^\ominus$, $(CF_3SO_2)_3C^\ominus$, and $B(C_6H_5)_4^\ominus$.

6. The composition according to claim 1, wherein the monomer of formula (I) is selected from the group consisting of:

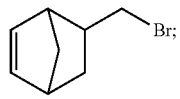

5-(bromomethyl)
bicyclo[2.2.1]
hept-2-ene (NBMeBr)

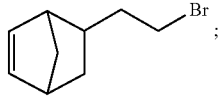

5-(2-bromomethyl)
bicyclo[2.2.1]
hept-2-ene (NBEtBr)

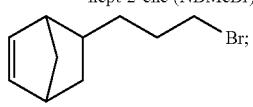

5-(3-bromopropyl)
bicyclo[2.2.1]hept-2-ene
(NBPrBr)

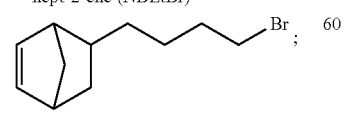

5-(4-bromobutyl)
bicyclo[2.2.1]hept-2-ene
(NBBuBr)

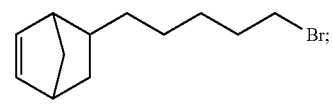

5-(5-bromopentyl)bicyclo
[2.2.1]hept-2-ene (NBPenBr)

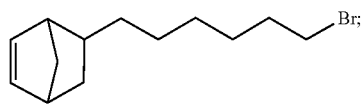

5-(6-bromohexyl)bicyclo[2.2.1]hept-2-ene
(NBHexBr)

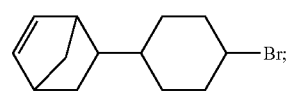

5-(4-bromocyclohexyl)bicyclo
[2.2.1]hept-2-ene

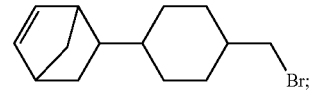

5-(4-bromomethyl)cyclohexyl)bicyclo
[2.2.1]hept-2-ene

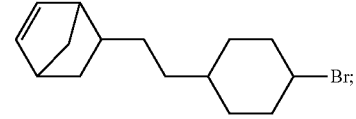

5-(2-(4-bromocyclohexyl)ethyl)bicyclo
[2.2.1]hept-2-ene

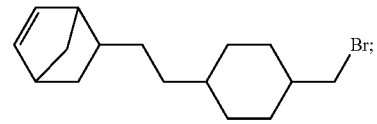

5-(2-(4-(bromomethyl)cyclohexyl)ethyl)bicyclo
[2.2.1]hept-2-ene

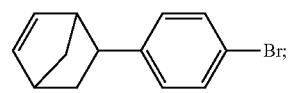

5-(4-(bromophenyl)bicyclo
[2.2.1]hept-2-ene

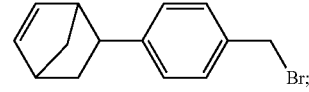

5-(4-(bromomethyl)phenyl)
bicyclo[2.2.1]hept-2-ene

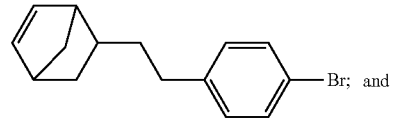

5-(4-(bromophenethyl)bicyclo[2.2.1]
hept-2-ene

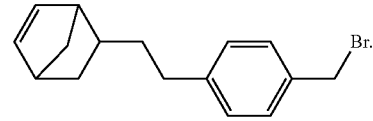

5-(4-(bromomethyl)phenethyl)bicyclo[2.2.1]
hept-2-ene

7. The composition according to claim 1, wherein the monomer of formula (III) is selected from the group consisting of:

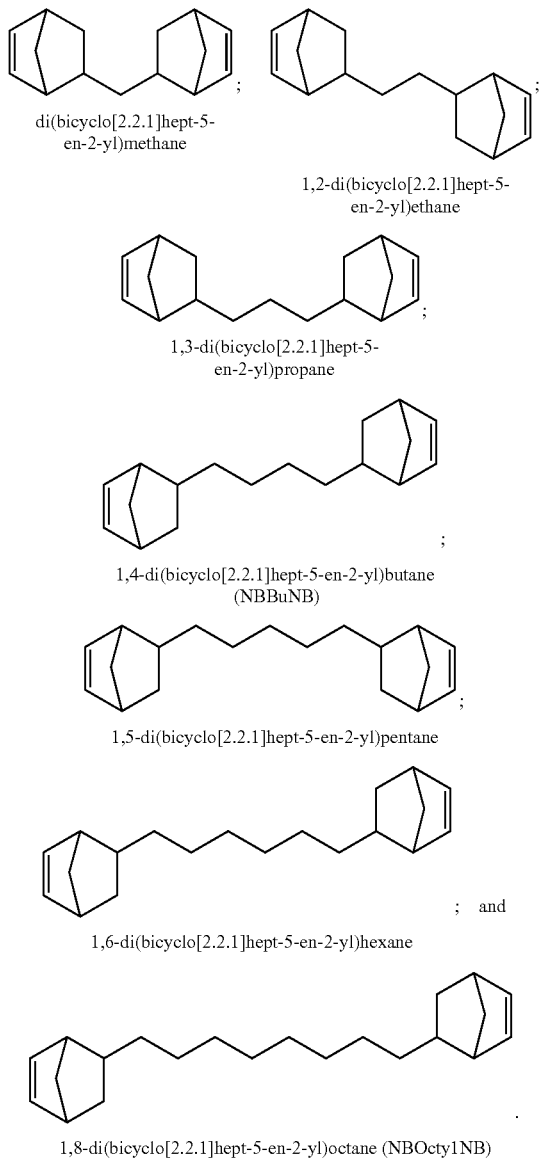

8. The composition according to claim 1, wherein the palladium compound of formula (IV) is selected from the group consisting of:

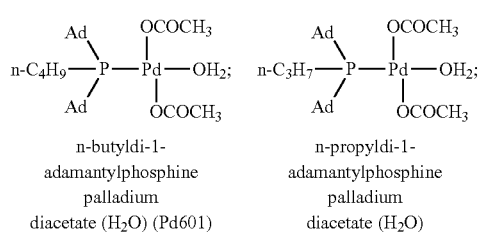

n-butyldi-1-adamantylphosphine palladium diacetate (H₂O) (Pd601)

n-propyldi-1-adamantylphosphine palladium diacetate (H₂O)

-continued

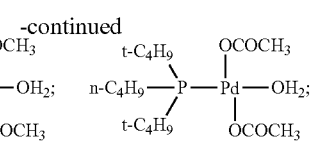

n-pentyldi-1-adamantylphosphine palladium diacetate (H₂O)

n-butyldi-tert-butylphosphine palladium diacetate (H₂O) (Pd445)

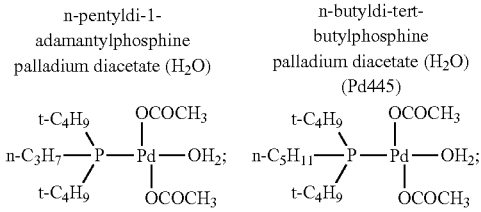

n-propyldi-tert-butylphosphine palladium diacetate (H₂O)

n-pentyldi-tert-butylphosphine palladium diacetate (H₂O)

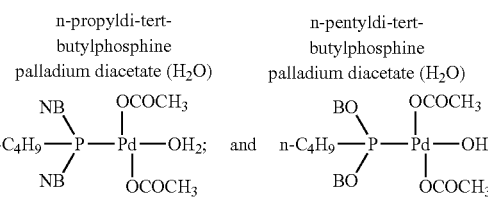

n-butyldi-1-norbornanylphosphine palladium diacetate (H₂O)

n-butyldi-1-bicyclo[2,2,2]octylphosphine palladium diacetate (H₂O)

9. The composition according to claim 2, wherein the monomer of formula (II) is selected from the group consisting of:

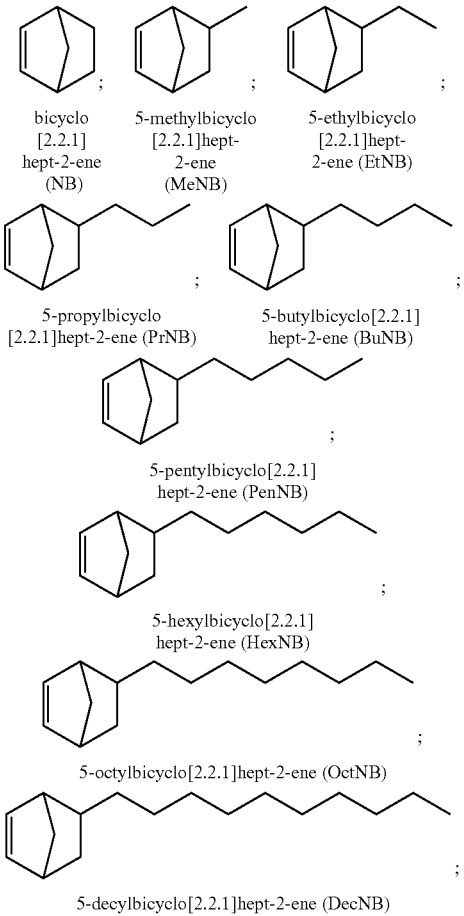

-continued

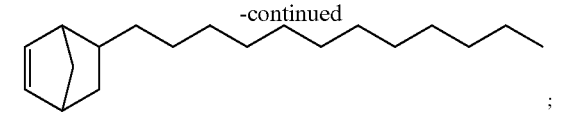
5-dodecylbicyclo[2.2.1]hept-2-ene (DoDecNB)

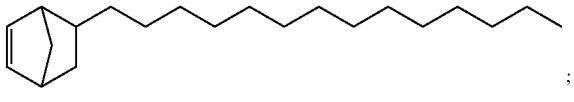
5-tetradecylbicyclo[2.2.1]hept-2-ene (TetraDecNB)

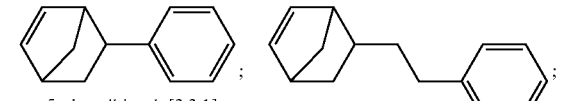
5-phenylbicyclo[2.2.1]hept-2-ene (PhNB); 5-phenethylbicyclo[2.2.1]hept-2-ene (PENB);

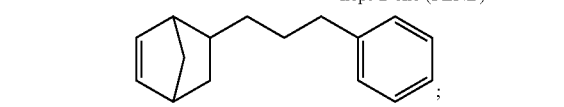
5-(3-phenylpropyl)bicyclo[2.2.1]hept-2-ene;

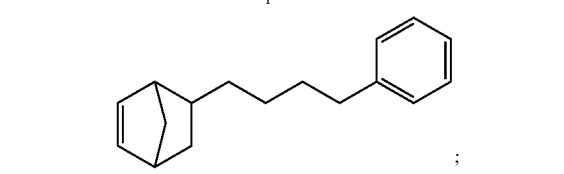
5-(4-phenylbutyl)bicyclo[2.2.1]hept-2-ene;

2-(bicyclo[2.2.1]hept-5-en-2-ylmethyl)naphthalene;

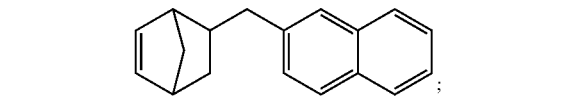
1-(bicyclo[2.2.1]hept-5-en-2-ylmethyl)naphthalene;

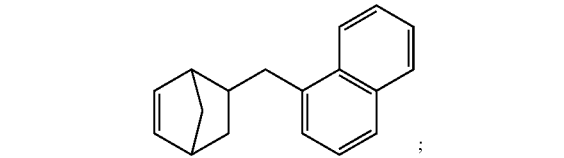
2-((3-methylbicyclo[2.2.1]hept-5-en-2-yl)methyl)naphthalene;

2-(bicyclo[2.2.1]hept-5-en-2-ylmethyl)-7-methylnaphthalene;

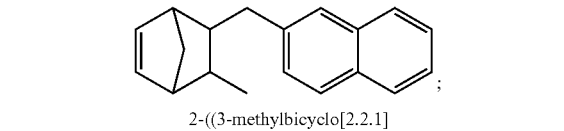
5-([1,1'-biphenyl]-3-ylmethyl)-bicyclo[2.2.1]hept-2-ene;

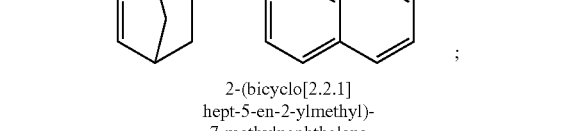
5-((2'-methyl-[1,1'-biphenyl]-3-yl)methyl)bicyclo[2.2.1]hept-2-ene;

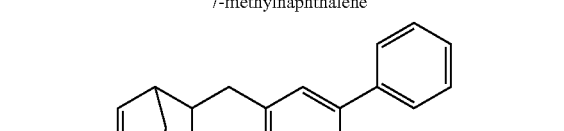
5-[1,1'-biphenyl]-4-ylmethyl)bicyclo[2.2.1]hept-2-ene;

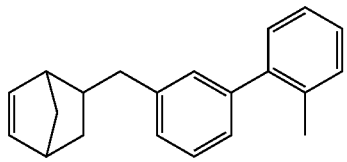
5-([1,1'-biphenyl]-2-ylmethyl)bicyclo[2.2.1]hept-2-ene;

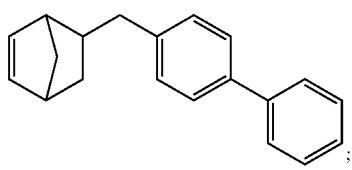
5-(2-([1,1'-biphenyl]-4-yl)ethyl)bicyclo[2.2.1]hept-2-ene (NBEtPhPh);

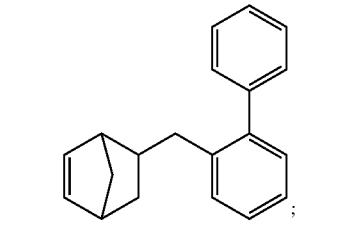
5-(2-(4'-ethyl-[1,1'-biphenyl]-4-yl)ethyl)bicyclo[2.2.1]hept-2-ene;

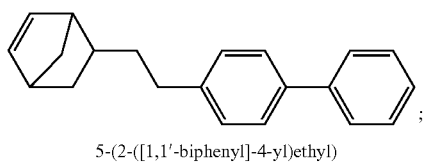
5-(2-([1,1'-biphenyl]-2-yl)ethyl)bicyclo[2.2.1]hept-2-ene; (9R,10S,11R,12S)-9,10-dihydro-9,10-[2]bicycloanthracene;

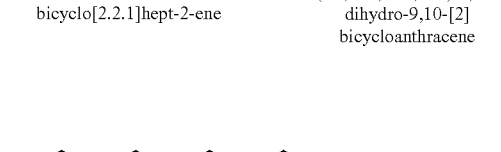
5-(3-([1,1'-biphenyl]-4-yl)propyl)bicyclo[2.2.1]hept-2-ene; and

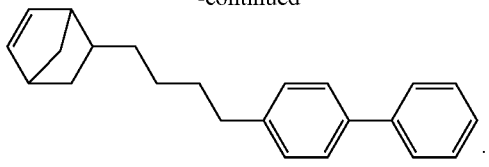

5-(4-([1,1'-biphenyl]-4-yl)butyl)bicyclo[2.2.1]hept-2-ene

10. The composition according to claim 1, wherein the compound of formula (VI) is selected from the group consisting of:
lithium tetrafluoroborate;
lithium triflate;
lithium tris(trifluoromethylsulfonyl)methanide);
lithium tetrakis(pentafluorophenyl)borate (LiFABA);
lithium tetraphenylborate;
lithium tetrakis(3,5-bis(trifluoromethyl)phenyl)borate;
lithium tetrakis(2-fluorophenyl)borate;
lithium tetrakis(3-fluorophenyl)borate;
lithium tetrakis(4-fluorophenyl)borate;
lithium tetrakis(3,5-difluorophenyl)borate;
lithium hexafluorophosphate;
lithium hexaphenylphosphate;
lithium hexakis(pentafluorophenyl)phosphate;
lithium hexafluoroarsenate;
lithium hexaphenylarsenate;
lithium hexakis(pentafluorophenyl)arsenate;
lithium hexakis(3,5-bis(trifluoromethyl)phenyl)arsenate;
lithium hexafluoroantimonate;
lithium hexaphenylantimonate;
lithium hexakis(pentafluorophenyl)antimonate;
lithium hexakis(3,5-bis(trifluoromethyl)phenyl)antimonate;
lithium tetrakis(pentafluorophenyl)aluminate;
lithium tris(nonafluorobiphenyl)fluoroaluminate;
lithium (octyloxy)tris(pentafluorophenyl)aluminate;
lithium tetrakis(3,5-bis(trifluoromethyl)phenyl)aluminate;
lithium methyltris(pentafluorophenyl)aluminate;
N,N-dimethylaniliniumtetrakis(pentafluorophenyl)-borate (DANFABA).

11. The composition according to claim 1, which is selected from the group consisting of:
a mixture of 5-propylbicyclo[2.2.1]hept-2-ene, 1,4-di(bicyclo[2.2.1]hept-5-en-2-yl)propane, 5-(3-bromopropyl)bicyclo[2.2.1]hept-2-ene, n-butyldi-1-adamantylphosphine palladium diacetate (H$_2$O) (Pd601) and lithium (diethyl ether) tetrakis(pentafluorophenyl)borate (LiFABA);
a mixture of 5-butylbicyclo[2.2.1]hept-2-ene (BuNB), 1,4-di(bicyclo[2.2.1]hept-5-en-2-yl)butane (NB-BuNB), 5-(4-bromobutyl)bicyclo[2.2.1]hept-2-ene (NBBuBr), n-butyldi-1-adamantylphosphine palladium diacetate (H$_2$O) (Pd601) and lithium (diethyl ether) tetrakis(pentafluorophenyl)borate (LiFABA);
a mixture of 5-pentylbicyclo[2.2.1]hept-2-ene, 1,4-di(bicyclo[2.2.1]hept-5-en-2-yl)propane, 5-(4-bromobutyl)bicyclo[2.2.1]hept-2-ene, n-butyldi-1-adamantylphosphine palladium diacetate (H$_2$O) (Pd601) and lithium (diethyl ether) tetrakis(pentafluorophenyl)borate (LiFABA); and
a mixture of 1,8-di(bicyclo[2.2.1]hept-5-en-2-yl)octane (NBOctylNB), 5-(4-bromobutyl)bicyclo[2.2.1]hept-2-ene (NBBuBr), n-butyldi-1-adamantylphosphine palladium diacetate (H$_2$O) (Pd601) and lithium (diethyl ether) tetrakis(pentafluorophenyl)borate (LiFABA).

12. A kit for forming an anion exchange membrane comprising:
a) one or more monomers of formula (I):

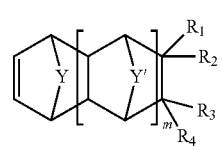

(I)

wherein:
Y and Y' are the same or different and independently of each other selected from the group consisting of —CH$_2$—, —CH$_2$—CH$_2$— and —O—;
m is an integer from 0 to 3;
at least one of R$_1$, R$_2$, R$_3$ or R$_4$ is a group of the formula R—X,
where R is selected from the group consisting of (C$_1$-C$_{10}$)alkylene, (C$_3$-C$_8$)cycloalkylene, (C$_1$-C$_{10}$)alkylene(C$_3$-C$_8$)cycloalkylene, (C$_1$-C$_{10}$)alkylene(C$_3$-C$_8$)cycloalkylene (C$_1$-C$_{10}$)alkylene, (C$_1$-C$_{10}$)alkylene(C$_6$-C$_{10}$)arylene and (C$_1$-C$_{10}$)alkylene(C$_6$-C$_{10}$)arylene(C$_1$-C$_{10}$)alkylene;
X is selected from the group consisting of halogen, hydroxy, (C$_1$-C$_{10}$)alkoxy and (C$_6$-C$_{12}$)aryloxy; and
the remaining R$_1$, R$_2$, R$_3$ and R$_4$ are independently of each other selected from the group consisting of hydrogen, methyl, ethyl, linear or branched (C$_3$-C$_{10}$) alkyl, (C$_3$-C$_8$)cycloalkyl, (C$_1$-C$_{10}$)alkyl(C$_3$-C$_8$)cycloalkyl and (C$_1$-C$_{10}$)alkyl(C$_6$-C$_{10}$)aryl;
b) one or more monomer of formula (III):

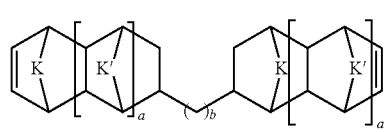

(III)

wherein:
a is an integer 0, 1 or 2;
b is an integer from 1 to 10; and
K and K' are the same or different and independently of each other selected from the group consisting of —CH$_2$—, —CH$_2$—CH$_2$—, —O— and —S—;
c) a palladium compound of formula (IV):

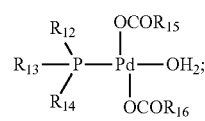

(IV)

and
wherein:
at least two of R$_{12}$, R$_{13}$ and R$_{14}$ are the same and is selected from the group consisting of tert-(C$_4$-C$_{12}$) alkyl, 1-(C$_1$-C$_5$)alkyl (C$_3$-C$_8$)cycloalkyl, 1-(C$_5$-C$_{12}$) bicycloalkyl and 1-(C$_8$-C$_{12}$)tricycloalkyl, (C$_6$-C$_{10}$) aryl and (C$_6$-C$_{10}$)aryl(C$_1$-C$_3$)alkyl;

and the remaining $R_{12}$, $R_{13}$ or $R_{14}$ is methyl, ethyl, linear or branched $(C_3-C_{12})$alkyl, $(C_6-C_{10})$aryl and $(C_6-C_{10})$aryl$(C_1-C_3)$alkyl; and $R_{15}$ and $R_{16}$ are the same or different and each independently selected from the group consisting of methyl, ethyl, linear or branched $(C_3-C_{20})$alkyl, trifluoromethyl, pentafluoroethyl, linear or branched $(C_3-C_{20})$perfluoroalkyl; and d) a compound of formula (VI):

wherein $M_d^\oplus$ is a cation selected from lithium, sodium, potassium, cesium, barium, ammonium and linear or branched tetra $(C_1-C_4)$alkyl ammonium;

$Z^\ominus$ is a weakly coordinating anion selected from the group consisting of $B(C_6F_5)_4^\ominus$, $B[C_6H_3(CF_3)_2]_4^\ominus$, $B(C_6H_5)_4^\ominus$, $[Al(OC(CF_3)_2C_6F_5)_4]^\ominus$, $BF_4^\ominus$, $PF_6^\ominus$, $AsF_6^\ominus$, $SbF_6^\ominus$, $(CF_3SO_2)_2N^\ominus$, $(CF_3SO_2)_3C^\ominus$ and $CF_3SO_3^\ominus$;

and wherein the amount of monomer of formula (III) present is no more than 3 mole percent based on the total combined moles of monomer of formula (I) and monomer of formula (III).

13. A method for forming an anion exchange membrane comprising:

forming a solution comprising:

a) one or more monomers of formula (I):

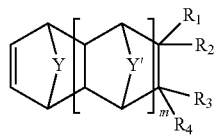

wherein:

Y and Y' are the same or different and independently of each other selected from the group consisting of —$CH_2$—, —$CH_2$—$CH_2$— and —O—;

m is an integer from 0 to 3;

at least one of $R_1$, $R_2$, $R_3$ or $R_4$ is a group of the formula R—X, where R is selected from the group consisting of $(C_1-C_{10})$alkylene, $(C_3-C_8)$cycloalkylene, $(C_1-C_{10})$alkylene$(C_3-C_8)$cycloalkylene, $(C_1-C_{10})$alkylene$(C_3-C_8)$cycloalkylene $(C_1-C_{10})$alkylene, $(C_1-C_{10})$alkylene$(C_6-C_{10})$arylene and $(C_1-C_{10})$alkylene$(C_6-C_{10})$arylene$(C_1-C_{10})$alkylene;

X is selected from the group consisting of halogen, hydroxy, $(C_1-C_{10})$alkoxy and $(C_6-C_{12})$aryloxy; and the remaining $R_1$, $R_2$, $R_3$ and $R_4$ are independently of each other selected from the group consisting of hydrogen, methyl, ethyl, linear or branched $(C_3-C_{10})$alkyl, $(C_3-C_8)$cycloalkyl, $(C_1-C_{10})$alkyl$(C_3-C_8)$cycloalkyl and $(C_1-C_{10})$alkyl$(C_6-C_{10})$aryl;

b) one or more monomer of formula (III):

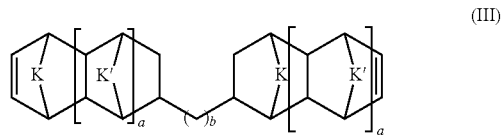

wherein:

a is an integer 0, 1 or 2;

b is an integer from 1 to 10; and

K and K' are the same or different and independently of each other selected from the group consisting of —$CH_2$—, —$CH_2$—$CH_2$—, —O— and —S—;

c) a palladium compound of formula (IV):

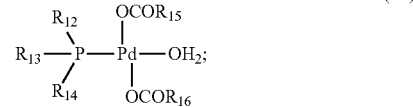

and wherein:

at least two of $R_{12}$, $R_{13}$ and $R_{14}$ are the same and is selected from the group consisting of tert-$(C_4-C_{12})$ alkyl, 1-$(C_1-C_5)$alkyl $(C_3-C_8)$cycloalkyl, 1-$(C_5-C_{12})$ bicycloalkyl and 1-$(C_8-C_{12})$tricycloalkyl, $(C_6-C_{10})$ aryl and $(C_6-C_{10})$aryl$(C_1-C_3)$alkyl;

and the remaining $R_{12}$, $R_{13}$ or $R_{14}$ is methyl, ethyl, linear or branched $(C_3-C_{12})$alkyl, $(C_6-C_{10})$aryl and $(C_6-C_{10})$aryl$(C_1-C_3)$alkyl; and $R_{15}$ and $R_{16}$ are the same or different and each independently selected from the group consisting of methyl, ethyl, linear or branched $(C_3-C_{20})$alkyl, trifluoromethyl, pentafluoroethyl, linear or branched $(C_3-C_{20})$perfluoroalkyl; and d) a compound of formula (VI):

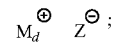

wherein $M_d^\oplus$ is a cation selected from lithium, sodium, potassium, cesium, Ma barium, ammonium and linear or branched tetra $(C_1-C_4)$alkyl ammonium;

$Z^\ominus$ is a weakly coordinating anion selected from the group consisting of $B(C_6F_5)_4^\ominus$, $B[C_6H_3(CF_3)_2]_4^\ominus$, $B(C_6H_5)_4^\ominus$, $[Al(OC(CF_3)_2C_6F_5)_4]^\ominus$, $BF_4^\ominus$, $PF_6^\ominus$, $AsF_6^\ominus$, $SbF_6^\ominus$, $(CF_3SO_2)_2N^\ominus$, $(CF_3SO_2)_3C^\ominus$ and $CF_3SO_3^\ominus$;

coating said solution onto a membrane support;

heating the coated membrane support to a temperature from about 80° C. to about 120° C. for about 30 minutes to about 90 minutes;

treating the heated membrane support with aqueous tri-$(C_1-C_4)$alkylamine solution at a temperature from about 20° C. to about 50° C. for about 2 days to about 5 days to form a quaternized anion exchange membrane; and washing the quaternized anion exchange membrane with water; and soaking the quaternized anion exchange membrane in alkali solution to form the anion exchange membrane;

and wherein the amount of monomer of formula (III) present is no more than 3 mole percent based on the total combined moles of monomer of formula (I) and monomer of formula (III).

14. The kit according to claim 12, which is selected from the group consisting of:

a mixture of 5-propylbicyclo[2.2.1]hept-2-ene, 1,4-di(bicyclo[2.2.1]hept-5-en-2-yl)propane, 5-(3-bromopropyl)bicyclo[2.2.1]hept-2-ene, n-butyldi-1-adamantylphosphine palladium diacetate ($H_2O$) (Pd601) and lithium (diethyl ether) tetrakis(pentafluorophenyl)borate (LiFABA);

a mixture of 5-butylbicyclo[2.2.1]hept-2-ene (BuNB), 1,4-di(bicyclo[2.2.1]hept-5-en-2-yl)butane (NB-BuNB), 5-(4-bromobutyl)bicyclo[2.2.1]hept-2-ene (NBBuBr), n-butyldi-1-adamantylphosphine palladium diacetate ($H_2O$) (Pd601) and lithium (diethyl ether) tetrakis(pentafluorophenyl)borate (LiFABA);

a mixture of 5-pentylbicyclo[2.2.1]hept-2-ene, 1,4-di(bicyclo[2.2.1]hept-5-en-2-yl)propane, 5-(4-bromobutyl)bicyclo[2.2.1]hept-2-ene, n-butyldi-1-adamantylphosphine palladium diacetate ($H_2O$) (Pd601) and lithium (diethyl ether) tetrakis(pentafluorophenyl)borate (LiFABA); and a mixture of 1,8-di(bicyclo[2.2.1]hept-5-en-2-yl)octane (NBOctylNB), 5-(4-bromobutyl)bicyclo[2.2.1]hept-2-ene (NBBuBr), n-butyldi-1-adamantylphosphine palladium diacetate ($H_2O$) (Pd601) and lithium (diethyl ether) tetrakis(pentafluorophenyl)borate (LiFABA).

15. The kit according to claim 12, which is:

a mixture of 5-propylbicyclo[2.2.1]hept-2-ene, 1,4-di(bicyclo[2.2.1]hept-5-en-2-yl)propane, 5-(3-bromopropyl)bicyclo[2.2.1]hept-2-ene, n-butyldi-1-adamantylphosphine palladium diacetate ($H_2O$) (Pd601) and lithium (diethyl ether) tetrakis(pentafluorophenyl)borate (LiFABA).

16. The kit according to claim 12, which is:

a mixture of 5-butylbicyclo[2.2.1]hept-2-ene (BuNB), 1,4-di(bicyclo[2.2.1]hept-5-en-2-yl)butane (NB-BuNB), 5-(4-bromobutyl)bicyclo[2.2.1]hept-2-ene (NBBuBr), n-butyldi-1-adamantylphosphine palladium diacetate ($H_2O$) (Pd601) and lithium (diethyl ether) tetrakis(pentafluorophenyl)borate (LiFABA).

17. The kit according to claim 12, which is:

a mixture of 5-pentylbicyclo[2.2.1]hept-2-ene, 1,4-di(bicyclo[2.2.1]hept-5-en-2-yl)propane, 5-(4-bromobutyl)bicyclo[2.2.1]hept-2-ene, n-butyldi-1-adamantylphosphine palladium diacetate ($H_2O$) (Pd601) and lithium (diethyl ether) tetrakis(pentafluorophenyl)borate (LiFABA).

18. The kit according to claim 12, which is:

a mixture of 1,8-di(bicyclo[2.2.1]hept-5-en-2-yl)octane (NBOctylNB), 5-(4-bromobutyl)bicyclo[2.2.1]hept-2-ene (NBBuBr), n-butyldi-1-adamantylphosphine palladium diacetate ($H_2O$) (Pd601) and lithium (diethyl ether) tetrakis(pentafluorophenyl)borate (LiFABA).

* * * * *